US011635536B2

(12) United States Patent
Chelminski

(10) Patent No.: US 11,635,536 B2
(45) Date of Patent: Apr. 25, 2023

(54) DEVICE FOR MARINE SEISMIC EXPLORATIONS FOR DEPOSITS

(71) Applicant: SERCEL INC., Houston, TX (US)

(72) Inventor: Stephen Chelminski, Peterborough, NH (US)

(73) Assignee: SERCEL INC., Houston, TX (US)

(*) Notice: Subject to any disclaimer, the term of this patent is extended or adjusted under 35 U.S.C. 154(b) by 1105 days.

(21) Appl. No.: 16/137,302

(22) Filed: Sep. 20, 2018

(65) Prior Publication Data

US 2019/0086563 A1    Mar. 21, 2019

Related U.S. Application Data

(60) Provisional application No. 62/561,494, filed on Sep. 21, 2017.

(51) Int. Cl.
*G01V 1/137* (2006.01)
*G01V 1/38* (2006.01)

(52) U.S. Cl.
CPC ............ *G01V 1/137* (2013.01); *G01V 1/3861* (2013.01); *G01V 2210/1293* (2013.01)

(58) Field of Classification Search
CPC .......... G01V 1/137; G01V 2210/1293; G01V 1/3861
USPC ........................................................ 367/144
See application file for complete search history.

(56) References Cited

U.S. PATENT DOCUMENTS

| 3,750,097 A * | 7/1973 | Havlik ................... G01V 1/387 181/115 |
| 4,114,723 A * | 9/1978 | Paitson .................. G01V 1/137 181/119 |
| 4,608,675 A * | 8/1986 | Chelminski ............ G01V 1/135 181/114 |
| 4,774,696 A * | 9/1988 | Otto ....................... G01V 1/006 181/120 |
| 4,858,205 A * | 8/1989 | Harrison ................ G01V 1/006 367/144 |
| 5,420,829 A * | 5/1995 | Pascouet ................ G01V 1/137 181/115 |
| 5,475,188 A * | 12/1995 | Cappelen ................. G01V 1/38 181/120 |
| 5,507,243 A * | 4/1996 | Williams, Jr. ........... G01V 1/38 114/245 |
| 2009/0219027 A1* | 9/2009 | Morrison ............... G01V 3/104 324/326 |
| 2010/0149911 A1* | 6/2010 | Hopperstad .............. G01V 1/08 367/23 |
| 2012/0072115 A1* | 3/2012 | Laws .................... G01V 1/3861 702/14 |
| 2012/0218869 A1* | 8/2012 | Hopperstad .......... G01V 1/3861 367/144 |

(Continued)

FOREIGN PATENT DOCUMENTS

GB           2225428 A   *   5/1990   ........... G01V 1/3861

*Primary Examiner* — Daniel L Murphy
(74) *Attorney, Agent, or Firm* — Patent Portfolio Builders PLLC

(57) ABSTRACT

A seismic source using tuned pulse sources to form an ultra-low frequency (ULF) cluster intended for use in generating seismic energy impulses for marine seismic exploration and more specifically to improved performance by increasing low frequency output to within a range of 1 Hz to 3 Hz to provide greater penetration of the seismic signal through complex overburden such as salt or basalt.

10 Claims, 23 Drawing Sheets

(56) References Cited

U.S. PATENT DOCUMENTS

| | | | |
|---|---|---|---|
| 2012/0300591 A1* | 11/2012 | Guevel | G01V 1/3817 |
| | | | 367/173 |
| 2014/0056109 A1* | 2/2014 | Norton, III | G01V 1/13 |
| | | | 367/144 |
| 2014/0238772 A1* | 8/2014 | Chelminski | G01V 1/38 |
| | | | 181/119 |
| 2017/0176620 A1* | 6/2017 | Lima | G01V 1/006 |
| 2019/0339404 A1* | 11/2019 | Schneider | G01V 1/006 |
| 2020/0217975 A1* | 7/2020 | Lima Santos | G01V 1/137 |
| 2020/0386902 A1* | 12/2020 | Xing | G01V 1/04 |
| 2020/0393583 A1* | 12/2020 | Williamson | G01V 1/13 |

* cited by examiner

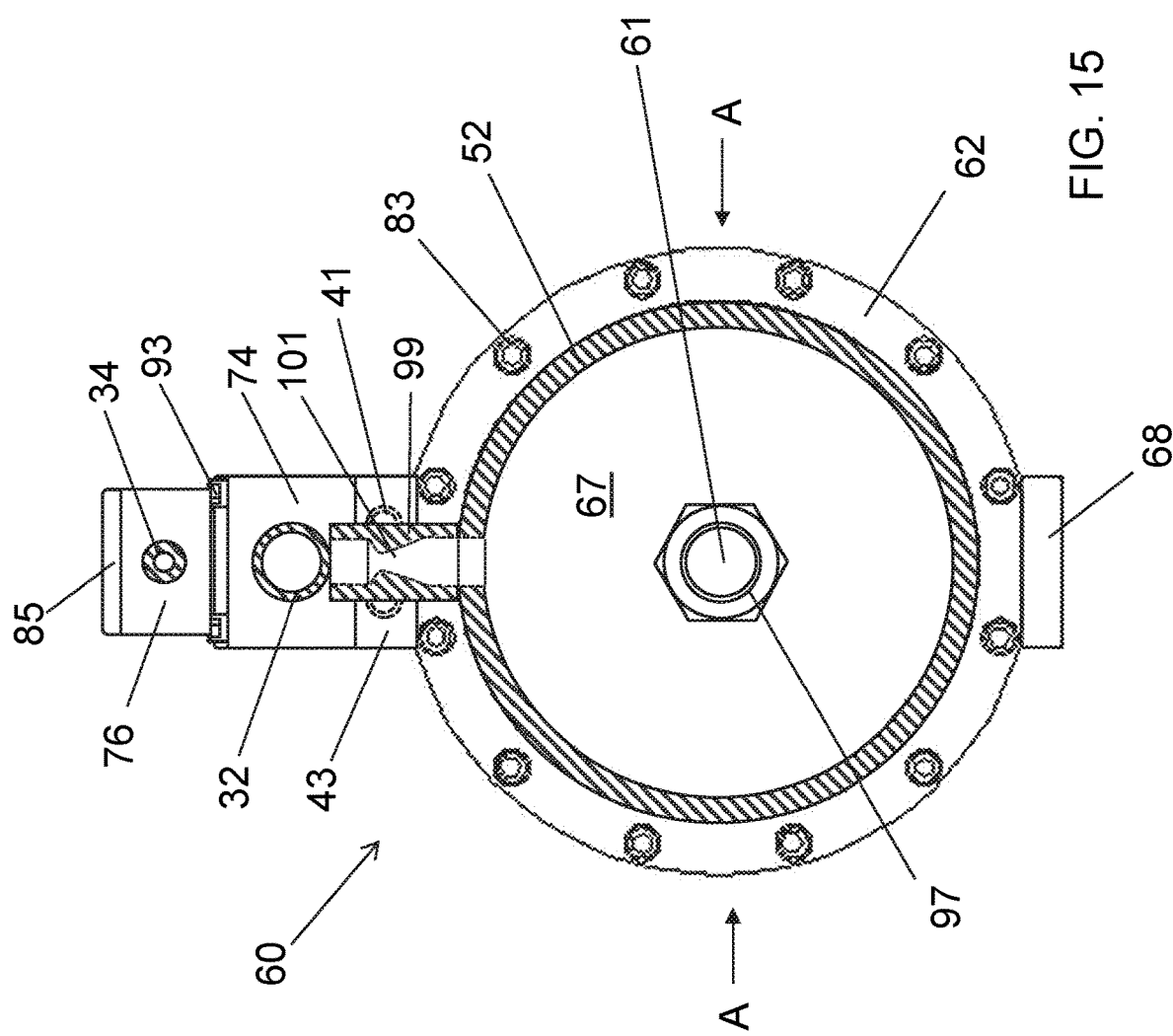

DEVICE FOR MARINE SEISMIC EXPLORATIONS FOR DEPOSITS

FIELD OF THE INVENTION

The present invention relates to a seismic source using tuned pulse sources to form an ultra-low frequency (ULF) cluster intended for use in generating seismic energy impulses for marine seismic exploration and more specifically to improved performance of a seismic source by increasing low frequency content to ranges from around 1 Hz to 3 Hz to provide greater penetration of the seismic signal through complex overburden such as salt or basalt.

BACKGROUND OF THE INVENTION

The priority of having low frequency content from seismic sources is increasing as oil and gas reservoirs are becoming deeper and more difficult to find, as increasingly only those that are not under complex overburden such as salt and basalt remain unfound. The low frequencies are important to penetrate through scattering and attenuating overburden and to build velocity models using methods such as Full Waveform Inversion. In addition to sub-salt and sub-basalt exploration, any reservoir characterization benefits from improved low frequency content because the low frequencies are required to build blocky reservoir models. In the absence of low frequencies in seismic data, well logs are used to substitute for low frequency data. This is a poor substitute because well log data is available only in and around wells, is expensive to acquire, and usually cannot be repenetrated for production monitoring. Academic research also benefits greatly from low frequencies because low frequencies enable imaging deeper into the earth's crust and upper mantle. However, the current conventional air guns used for seismic analysis fail to provide sufficient low frequency. It is an objective and advantage of the present invention that low frequency signals are acquired down to 1 Hz useful signal.

The conventional air guns of the prior art produce output frequencies generally between 4 Hz to about 1200 Hz. These air guns are typically fired at compressed air pressures in the range of 2000 psi to 3000 psi. The initial pulse or primary pressure pulse produced is less than 1.5 milliseconds (ms) of rise time to reach peak pressure which produces an abundance of high frequency components in the primary pressure pulse. The high frequency components are out of the range of interest for seismic analysis and therefore are not beneficial in the identification of subsurface geological structures. High frequencies may further be a source of damage to marine mammals and fish and may as well disturb the habitats and well-being of marine life. It is a further objective and advantage of the present invention that these undesirable high frequencies are eliminated.

In the present invention, a seismic source, seismic source array, or cluster as used herein, is defined as a plurality of tuned pulse sources (TPS) selected based on survey requirements. Two or more tuned pulse sources may be "clustered" together to increase output performance. The operating components of the tuned pulse sources within the seismic source of the present invention include a firing chamber holding a charge of gas under high pressure, a two-piston shuttle assembly having a firing piston which retains the charge of pressurized gas within the firing chamber, and an operating piston positioned within an operating chamber where the highly pressurized gas acts against the operating piston to maintain the shuttle assembly in a closed position until firing. The tuned pulse source is triggered using a solenoid operated valve to release pressurized air into the operating chamber actuating the shuttle assembly to cause an abrupt discharge of pressurized air from the firing chamber through discharge ports and directly into the surrounding water creating an acoustic pulse.

The inventor hereof has additional patents on air guns and tuned pulse source design such as U.S. Pat. Nos. 3,379,273, 4,038,630, 4,271,924, 4,599,712, 4,712,202, 4,779,245, 5,432,757, 8,223,591, 8,971,152, 9,804,280, and 10,031,245.

OBJECTS AND SUMMARY OF THE INVENTION

The present invention is an ultra-low frequency (ULF) cluster seismic source formed using tuned pulse sources (TPS) bracketed together to be used in a seismic source array. The ULF cluster is designed and tuned to specific frequency ranges based on the number and energy output of the tuned pulse sources selected. The tuned pulse sources within the ULF cluster may be fired simultaneously or with a time delay as a phased cluster to increase overall energy output and enhance low frequency content. Characteristics of the output signal may also be preset through selecting specific lengths of the firing chamber for the tuned pulse sources within the ULF cluster to tune the rise time and slope of the output pulse. Using firing chambers of lengths between 0.61 meters (2 feet) to 6.1 meters (20 feet) the rise time of the initial pulse may be tuned as described in U.S. Pat. No. 9,804,280 to the same inventor. In the present invention, embodiments of tuned pulse sources used within the ULF cluster provide an average rising slope of the primary pressure pulse of less than 0.4 bar-m/ms and more specifically in a range of 0.05 bar-m/ms to 0.30 bar-m/ms. A port exit area for each tuned pulse source is created at a rate greater than or equal to 50 square centimeters per millisecond and includes an inner port structure that immediately opens when the tuned pulse source is fired, therefore the tuned pulse source has zero acceleration distance with increased coupling of the surface area of the compressed air from the firing chamber to water when fired.

In embodiments of the tuned pulse sources used in the cluster formation a continuous smooth throat of a uniform and similar diameter to the firing chamber with little or no restrictions connecting to the discharge ports is provided reducing turbulence and cavitation as the air exits the discharge ports and improving the acoustic efficiency of the tuned pulse source. Embodiments of the tuned pulse sources used in the cluster formation of the present invention further include rectangular discharge ports of constant width along the length of the ports to reduce a source of high frequencies and improve the efficiency of the tuned pulse source. Embodiments of the present invention include an integrated communications connector that is separable from the tuned pulse source housing for improved control, easier access to components and easier replacement of tuned pulse sources within the cluster if a failure occurs. The integrated communications connector may provide control of firing each tuned pulse source within the ULF cluster through electronics to control a solenoid operated valve that triggers the firing of each tuned pulse source. The integrated communications connector may further transmit the time instant when a tuned pulse source has fired to the exploration vessel and may further monitor the wave shape character of the tuned pulse source sound pulse using an on-board near field hydrophone. The temperature and pressure of the surrounding water may also be monitored through the integrated communications connector to assist in determining the effect on the marine environment and depth where the tuned pulse source is being operated.

Embodiments of the tuned pulse sources used in the cluster formation further include a backbone brazed along a main housing, the backbone having a short, vertical trigger passage to the operating chamber for firing and one or more bores to supply compressed air to the operating chamber and an air passage fitting to fill the firing chamber. Embodiments of the tuned pulse sources used in the cluster formation further include a removable supply distribution valve for filling the operating chamber and firing chamber separately. Embodiments of the distribution valve include an air release safety device using directional flow valves to prevent an erratic discharge of air from the tuned pulse source (TPS) on deck or during deployment or retraction from the water which may cause damage and injury. Embodiments of the tuned pulse sources used in the cluster formation further include piping and valves to release air from the operating chamber separately from the firing chamber. Embodiments of the tuned pulse source of the present invention may operate at a range of pressures from 200 psi to 3000 psi and more preferably at pressures from 400 psi to 1000 psi. The lower operating pressures is one factor that helps to eliminate undesirable high frequencies.

It is an object and advantage of the invention to provide embodiments of a ULF cluster which increases low frequency output and reduces or eliminates harmful and unusable high frequencies.

It is an object and advantage of the invention to provide embodiments of a ULF cluster which produce increased low frequency content in a range from about 1 Hz-3 Hz.

It is an object and advantage of the invention to design embodiments of a ULF cluster to produce low frequency content within a specific range by selecting the number and energy output of the tuned pulse sources within the cluster formation.

It is an object and advantage of the invention to design embodiments of a ULF cluster to adjust output pulse characteristics by selecting a specific length of firing chamber for the tuned pulse sources within the cluster formation.

It is an object and advantage of the invention to provide embodiments of a tuned pulse source array that will produce more low frequency energy than conventional air gun arrays.

It is an object and advantage of the present invention to produce embodiments of a tuned pulse source used in the cluster formation of the present invention that has no acceleration distance meaning that compressed air is released through the ports immediately when the shuttle disengages from the firing seal.

It is an object and advantage of the present invention to produce embodiments of a tuned pulse source used in the cluster formation of the present invention that releases compressed air through a nearly 360° inner port structure.

It is an object and advantage of the invention to provide embodiments of a tuned pulse source used in the cluster formation of the present invention which has rectangular discharge ports of constant width along the length of the ports providing large coupling of the surface area of the firing chamber compressed air to water when fired.

It is an object and advantage of the invention to provide embodiments of a tuned pulse source used in the cluster formation of the present invention with a port exit area that is created at rates of greater than or equal to 50 cm²/ms and a pulse rise time slope of less than 0.4 bar-m/ms and more specifically at less than 0.05 to 0.30 bar-m/ms.

It is an object and advantage of the present invention to assemble embodiments of a tuned pulse source that may use vacuum oven brazing at mating surfaces to affix a reinforcing backbone to the cylindrical housing, the back bone having air passages for providing compressed air separately to the operating chamber and firing chamber.

It is an object and advantage of the present invention to provide embodiments of a tuned pulse source used in the cluster formation of the present invention that include an integrated communications connector assembly with a near-field hydrophone sensor that is directed towards and at an equal distance from the discharge ports of each tuned pulse source within the cluster formation.

It is an object and advantage of the present invention to provide embodiments of a tuned pulse source used in the cluster formation of the present invention that include a distribution valve assembly that separately fills the operating chamber and firing chamber.

It is an object and advantage of the present invention to provide embodiments of a tuned pulse source used in the cluster formation of the present invention that include an air release safety device using directional flow valves to prevent an erratic discharge of the tuned pulse source on deck or during deployment or retraction from the water which may cause damage and injury.

It is an object and advantage of the present invention to provide embodiments of a tuned pulse source used in the cluster formation of the present invention that include piping and valves to release air from the operating chamber separately from the firing chamber.

It is an object and advantage of the present invention to provide embodiments of a tuned pulse source used in the cluster formation of the present invention that include a firing circuit and solenoid valve assembly and a connector assembly which is bolted on horizontally in the direction of towing of the tuned pulse source by the exploration vessel and wherein the main firing control cable passes through the connector assembly with electric wire branch connections leading to control circuits for controlling the solenoid valve and to connect pressure, temperature, and hydrophone sensors.

It is an object and advantage of the present invention to provide embodiments of a tuned pulse source used in the cluster formation of the present invention that includes a tuned pulse source firing circuit and solenoid valve assembly as well as a connector assembly which can be removed from the firing circuit and solenoid valve assembly wherein either assembly may be replaced independently of the other without disturbing any wiring.

The present invention is related to a cluster of seismic sources for marine seismic exploration, comprising a ring-shaped bracket configured to hold more than three seismic sources and hold up to twelve seismic sources. In embodiments of the cluster for marine seismic exploration, the seismic sources are equidistant from the center point of the ring-shaped bracket. In embodiments of the cluster for marine seismic exploration, the seismic sources are formed in a circular pattern of outlet ports at a distance near enough for the signal output bubble to coalesce when firing similar to the output signal from a single seismic source. In embodiments of the cluster of seismic sources for marine seismic exploration, the longitudinal axis of each of the seismic sources is in parallel with the center line of the ring-shaped bracket. In embodiments of the cluster of seismic sources for marine seismic exploration, the ring-shaped bracket supports the firing chambers of the seismic sources. In embodiments, the cluster of seismic sources for marine seismic exploration comprises a plurality of ring-shaped brackets configured to support long firing chambers.

In some embodiments the ring-shaped bracket of the cluster comprises a center hub; spokes affixed to the center hub; outer frame affixed to the spokes; a support for the seismic source affixed to the outer frame; and a clamp removable from the support to secure the seismic source to the support. The ring-shaped bracket may also comprise a brace affixed between each support for the seismic source. The ring-shaped bracket may also comprise a supply bracket configured to support air and electrical conduits from the seismic source. Embodiments of the cluster of seismic sources may comprise two concentric rings of seismic sources. Embodiments of the cluster may comprise the operation of the seismic sources using a firing sequence to have all or some of the seismic sources within the cluster fire at different points in time The firing sequence may comprise a time delay of between 1 and 50 milliseconds between the firing of each seismic source in the order of the firing sequence. The firing sequence may have a preset pattern as shown in FIG. 11. The firing sequence may have a preset pattern as shown in FIG. 12B.

The present invention is also related to a tuned pulse source for seismic exploration comprising an air distribution valve assembly; and wherein a firing chamber is filled with compressed air through an air input passage separate from the air input passage that fills an operating chamber. In some embodiments, the air distribution valve assembly of the tuned pulse source comprises a valve configured to vent the firing chamber separately from venting the operating chamber. In some embodiments, the valve of the air distribution valve assembly is a check valve. Embodiments of the tuned pulse source for seismic exploration may comprise an air release valve configured to pressurize and vent the operating chamber. Embodiments of the tuned pulse source for seismic exploration may comprise an air release valve configured to vent the firing chamber.

The objects, advantages and features of the present invention, which are believed to be novel, are set forth with particularity in the appended claims. These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

Specific embodiments of the invention have been chosen for the purpose of illustration and description, and are shown in the accompanying drawings, which form a part of this specification. The present invention, both as to its organization and manner of operation, together with further objects and advantages, may best be understood by reference to the following description, taken in connection with the accompanying drawings, wherein:

FIG. 15 is an end view from the front of an embodiment of the tuned pulse source of the present invention showing the integrated communications connector and the distribution valve assembly;

DETAILED DESCRIPTION OF THE DRAWINGS

Figure 1:
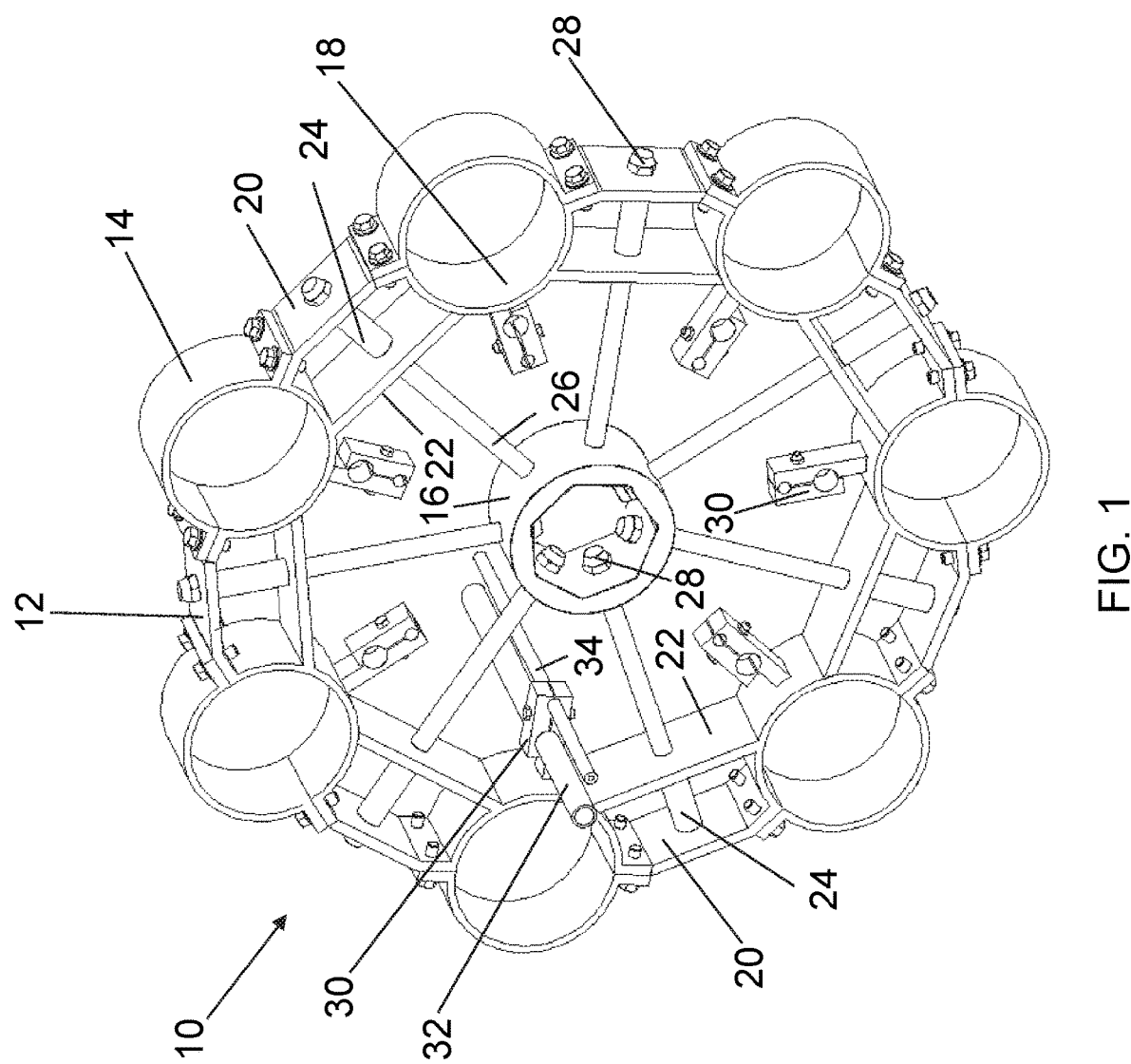
FIG. 1 is a perspective view of an embodiment of a cluster bracket for holding seven tuned pulse sources in an embodiment of the present invention.

The present invention as described herein is an improvement to a seismic source that uses an array of tuned pulse sources to generate seismic energy. The tuned pulse sources may be deployed individually or in cluster formation. The present invention provides in a first embodiment a ring-shaped cluster bracket 10 that forms a unique circular pattern to support up to seven tuned pulse sources that are radially spaced and may be equidistant from a center point, as shown in FIG. 1. The ring-shaped design provides for more sources to be clustered than is commonly known in the prior art where most commonly only a pair of air guns or a cluster of three air guns in a triangular shape are known. Using the ring-shape, the tuned pulse sources may be clustered with a minimal amount of distance between any two sources. The cluster bracket 10 as shown is formed with a circular frame 12, a series of semi-circular clamps 14 and an internal hub 16. The circular frame 12 has a series of semi-circular saddle-like supports 18 that are welded together using external frame pieces 20. The circular frame 12 also has a brace 22 welded between each semi-circular support 18. A sleeve 24 is welded between each external frame piece 20 and support brace 22 to provide additional strength to the cluster bracket 10. The sleeve 24 is positioned around an opening in the external frame piece 20 and an opening in the support brace 22. A spoke 26 extends from the central hub 16 through a support brace 22, a sleeve 24 and an external frame 20 to support the circular frame 12 on the hub 16. The spokes 26 are spaced radially around the central hub 16 and are threaded to have a cap or nut 28 secure each spoke 26 to the central hub 16 and to the circular frame 12.

A supply bracket 30 is welded to each semi-circular support 18 to support a compressed air supply conduit 32 and an electrical cable conduit 34.

Figure 2:
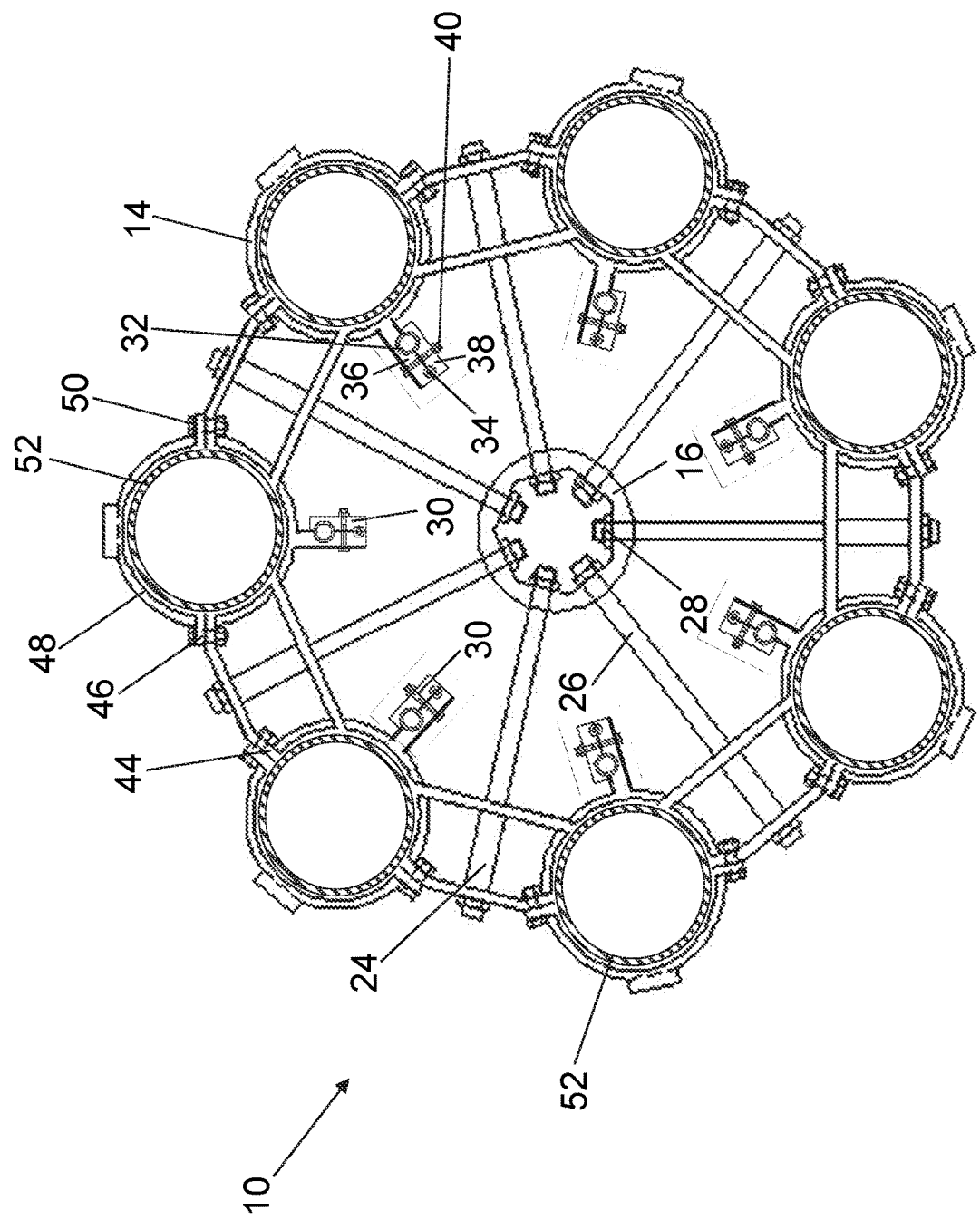
FIG. 2 is a front elevation view of the embodiment of the cluster bracket for holding seven tuned pulse sources of FIG. 1.

As shown in FIG. 2, each supply bracket 30 is formed with an extension support 36 having semi-circular cutouts for the air supply conduit 32 and the electrical cable conduit 34. The extension support 36 is welded along an outer, center portion of each semi-circular support 18 to extend in towards the central hub 16. The compressed air supply conduit 32 and an electrical cable conduit 34 are placed within each appropriately sized semi-circular cutout and a mating conduit block 38 having similar semi-circular cutouts that surround the conduits is affixed to the extension support 36 using a bolt 40 or other fastener. The external frame piece 20 is formed with an angled portion 44 on each end to form the circular shape of the cluster bracket 10. A flange 46 that extends from either side of the semi-circular body 48 of the clamp 14 is placed on the angled end portion 44 to provide a flat surface to surround and hold the firing chamber 52 of a tuned pulse source 60 and bolts 50 are used to secure each semi-circular clamp 14 to each semi-circular support 18 and hold the firing chamber 52 in place within the cluster bracket 10.

Figure 3:
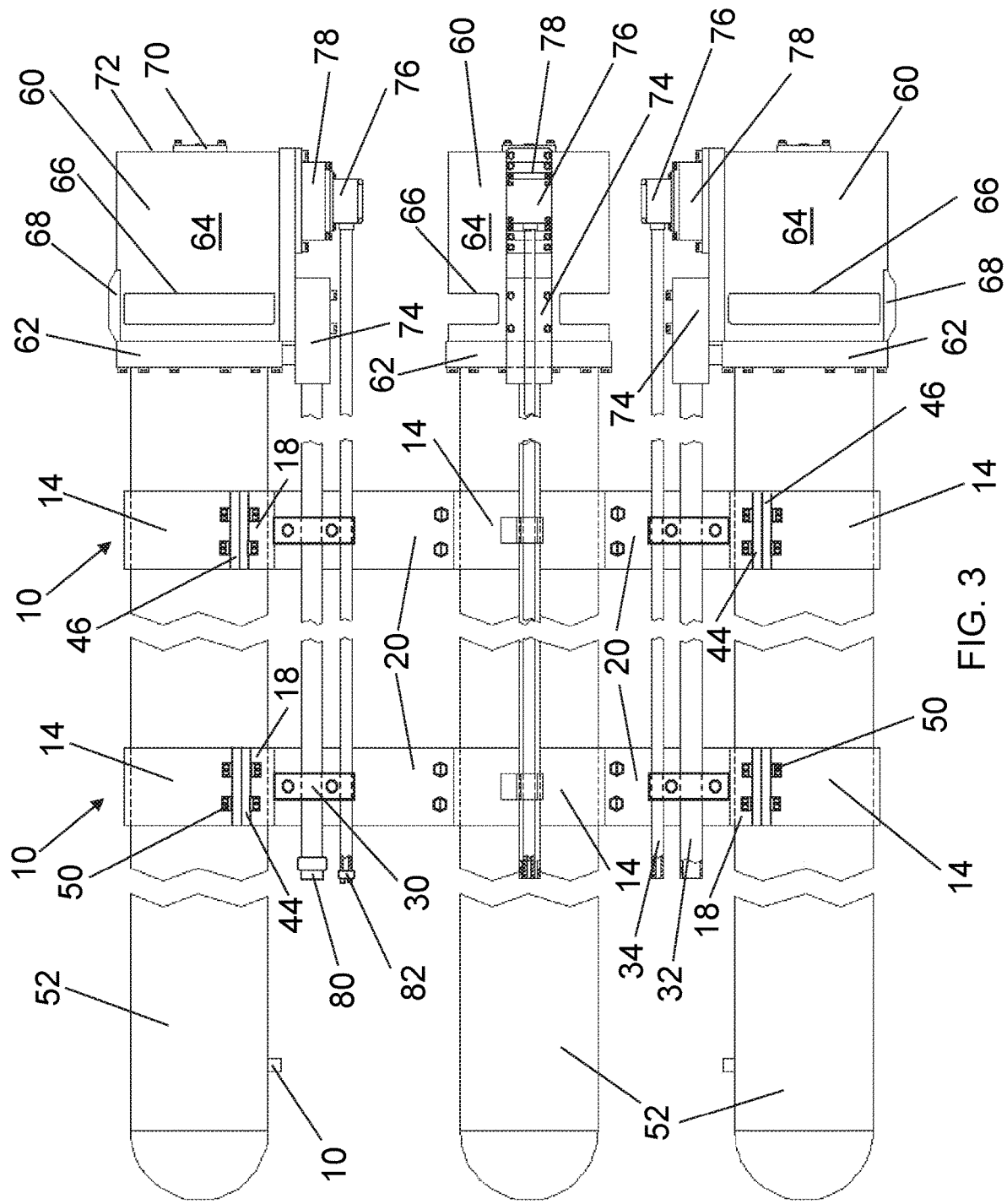
FIG. 3 is a side elevation view of an embodiment of three tuned pulse sources mounted within an embodiment of the cluster bracket of the present invention.

The cluster bracket 10 of the present invention is very different from clusters of the prior art. In the present invention, the cluster bracket 10 is supported on the firing chamber 52 as opposed to prior art clusters that support a cluster bracket on the main housing 64. The main housing 64 of the tuned pulse source 60 may therefore be removed from the firing chamber 52 for repair without removing the firing chamber from the cluster bracket 10. As shown in FIG. 3, one or more cluster brackets 10 are supported along the firing chamber 52 with the center line of the cluster bracket 10 in parallel with the longitudinal axis of the firing chamber 52. The firing chamber 52 of each tuned pulse source 60 placed in a semi-circular support 18 and a clamp 14 positioned around each firing chamber 52 and bolted to the semi-circular support 18, the tuned pulse sources 60 are secured within the circular frame of the cluster bracket 10. Based on the length of the firing chamber 52 one or more cluster brackets 10 are used to structurally support the desired number of tuned pulse sources 60 together within the cluster. In the tuned pulse source 60 of the present invention, each firing chamber 52 has an outer flange 62 that is bolted to the main housing 64 of the tuned pulse source 60 to align the opening of the firing chamber 52 at the outlet ports 66. A stiffening bar 68 may be vacuum brazed or bolted to the upper or lower surface of the main housing 64 and an air release valve 70 is positioned on the end cap 72 of the main housing 64. In embodiments of the tuned pulse source 60 of the present invention as shown, the air supply conduit 32 extends along the firing chamber 52 to an air distribution valve assembly 74 and the electrical cable conduit 34 extends to the integrated communications connector 76. The conduit block 38 is removed from the extension support 36 and the air supply conduit 32 and the electrical cable conduit 34 are aligned in the cutouts of the extension support 36. The conduit block 38 is then again bolted to the extension support 36 to provide structural support to the air supply conduit 32 and the electrical cable conduit 34. The compressed air supply conduit 32 and electrical cable conduit 34 are formed from rigid piping to withstand the vibrational forces from firing the tuned pulse source 60.

Figure 4:
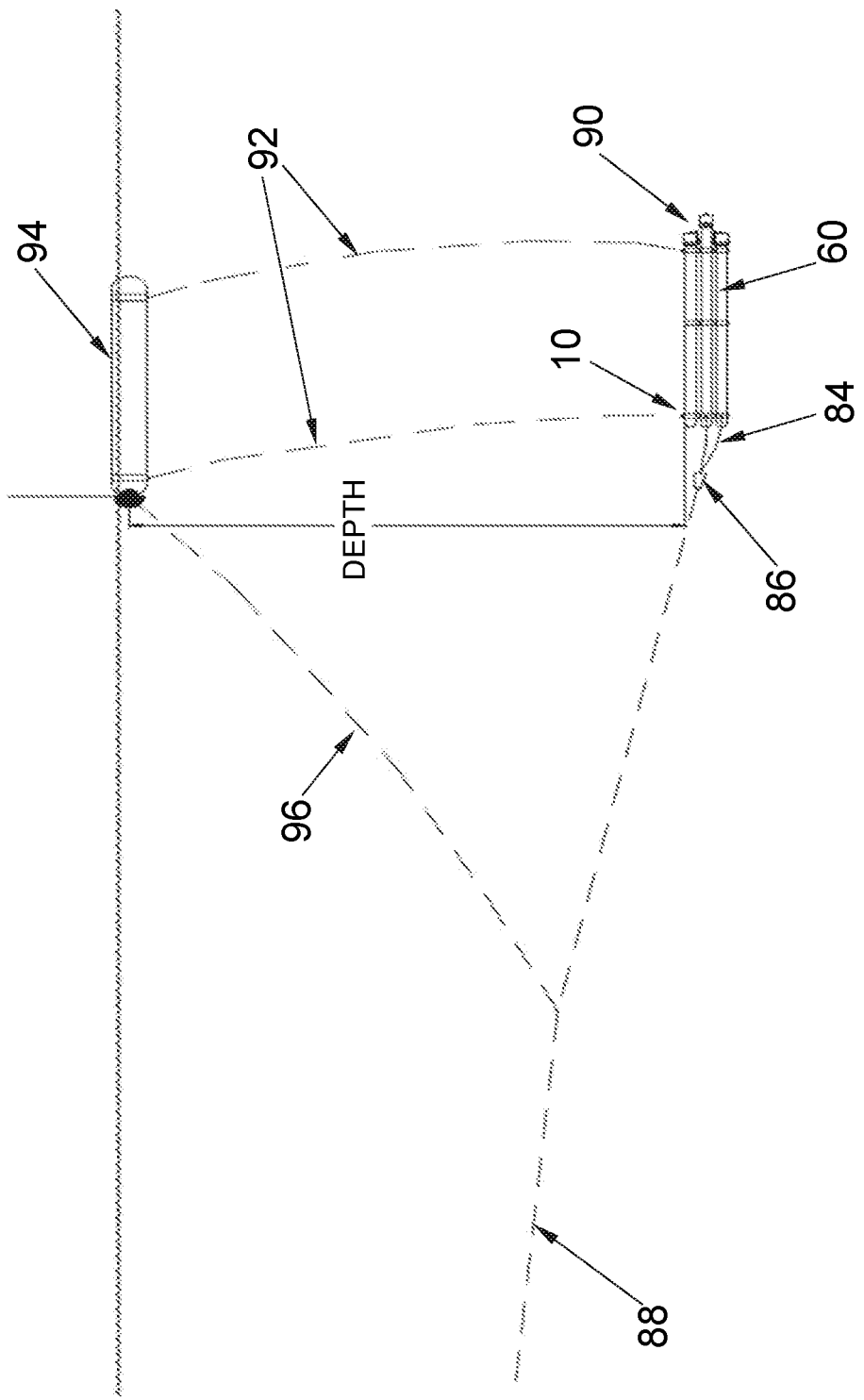
FIG. 4 is an embodiment of a ULF cluster with suspension float for towing behind a vessel.

As shown in FIG. 4, the air supply line from the cable harness 84 is connected to a pneumatic fitting 80 at the end of the air supply conduit 32 and an electrical cable connector 82 on each end of the electrical cable conduit 34 has electrical wires 83 running through the conduit to connect electrical cables from the cable harness 84 to the integrated communications connector 76 for each tuned pulse source 60. The cable harness 84 is connected to a bell housing 86 that is attached to an umbilical 88 that provides the compressed air and electrical power from the survey vessel. The cluster brackets 10 supporting the ULF cluster 90 of tuned pulse sources 60 are attached to suspension chains 92 that are suspended from a suspension float 94. A guide line 96 is suspended from the float 94 and attached to the umbilical 88. The ULF cluster 90 is suspended at various depths and fired to collect seismic data.

Based on the dimensions of the cluster bracket 10 and survey requirements, any number of tuned pulse sources 60 may be clustered to produce the signal strength and characteristics desired for the seismic pulse. The cluster bracket 10 strongly holds the tuned pulse sources 60 in a fixed configuration that sets a specific distance between the tuned pulse seismic sources. By arranging the cluster in a ring and at the closer distances, the unique design of the tuned pulse sources of the present invention will emit a seismic pulse that forms a much more spherical bubble with sufficient energy and low frequency content to provide greater penetration particularly through basalt and sub-basalt structures that were previously difficult to survey.

Figure 5A:
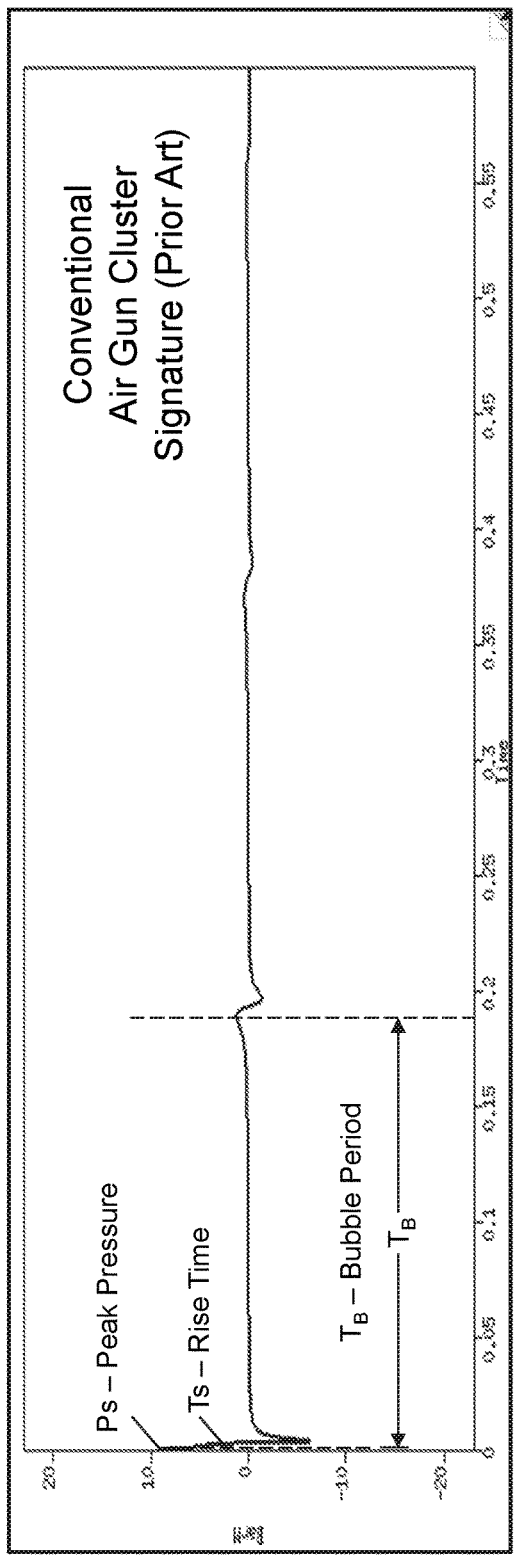
FIG. 5A is an embodiment of a signature from a conventional air gun cluster of the prior art.
Figure 5B:
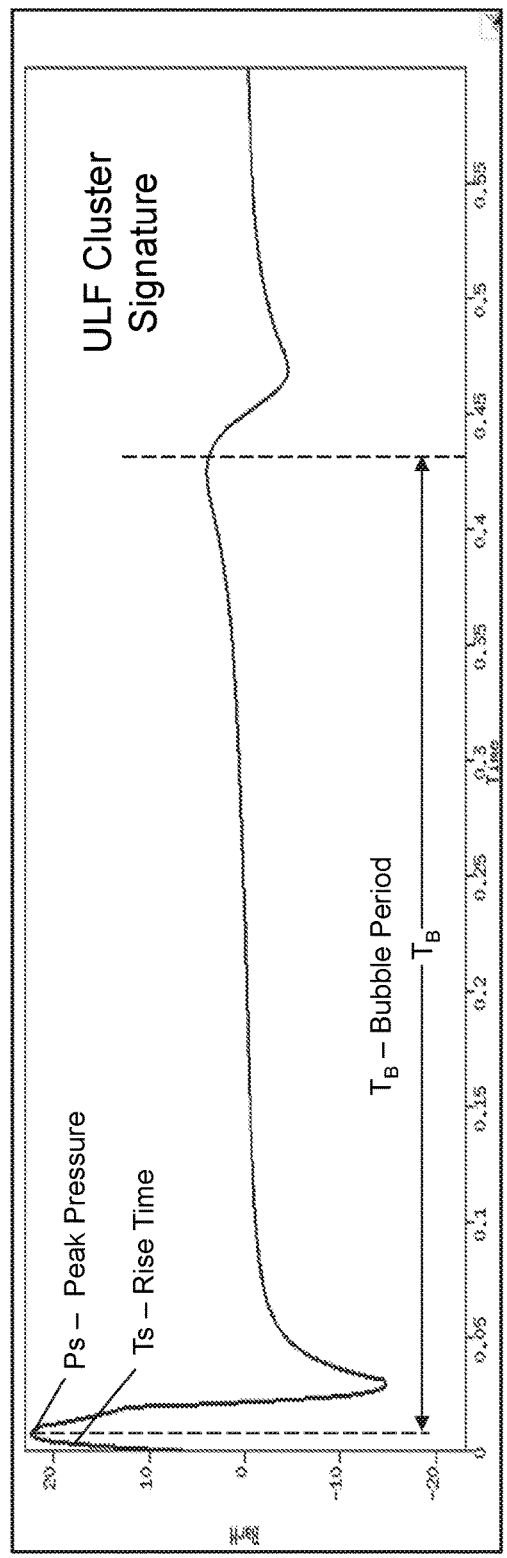
FIG. 5B is an embodiment of a signature from the ULF cluster of the present invention.
Figure 5C:
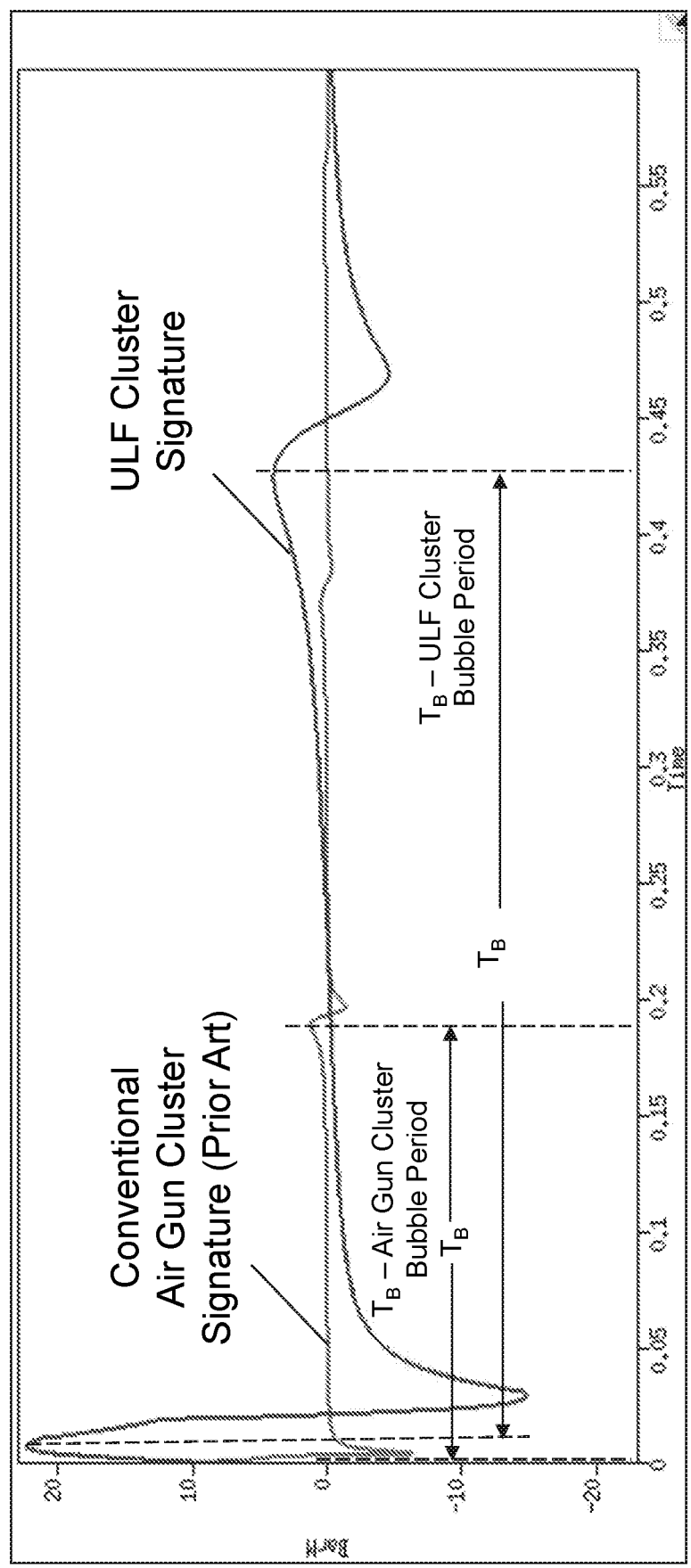
FIG. 5C is an embodiment of the signatures from the conventional air gun cluster of the prior art and the ULF cluster from FIGS. 5A and 5B.
Figure 6A:
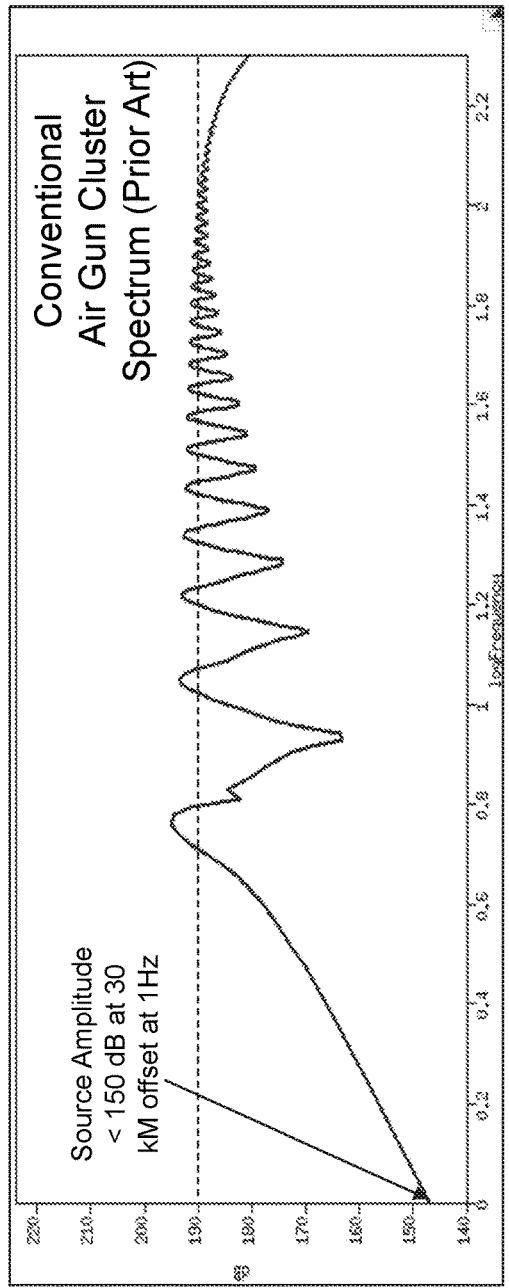
FIG. 6A is an embodiment of the spectrum from the signature of the conventional air gun cluster of the prior art of FIG. 5A.
Figure 6B:
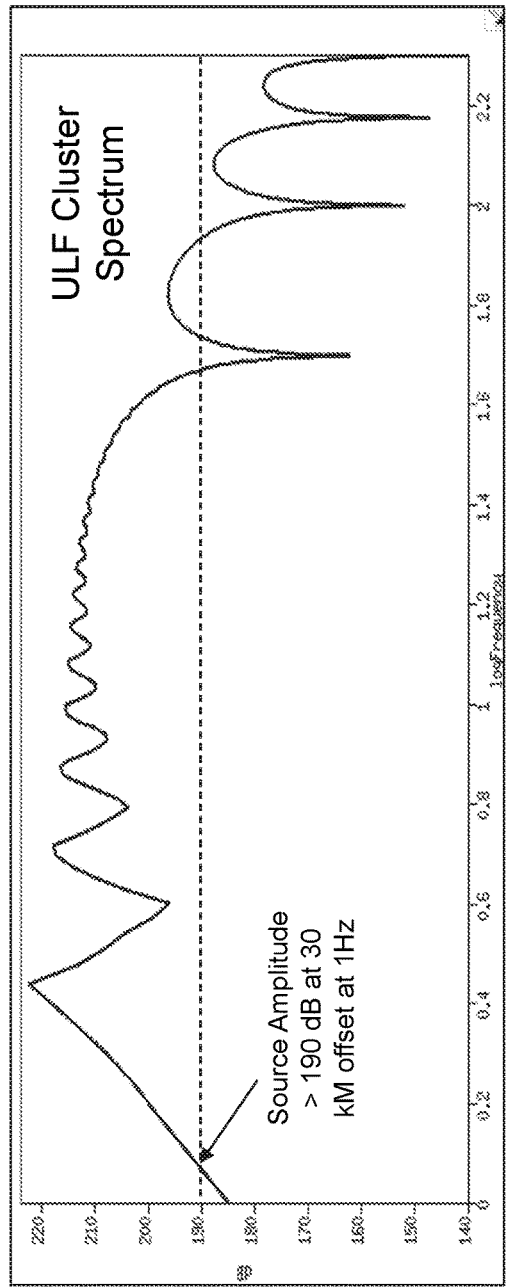
FIG. 6B is an embodiment of the spectrum from the signature from the ULF cluster from FIG. 5B.
Figure 6C:
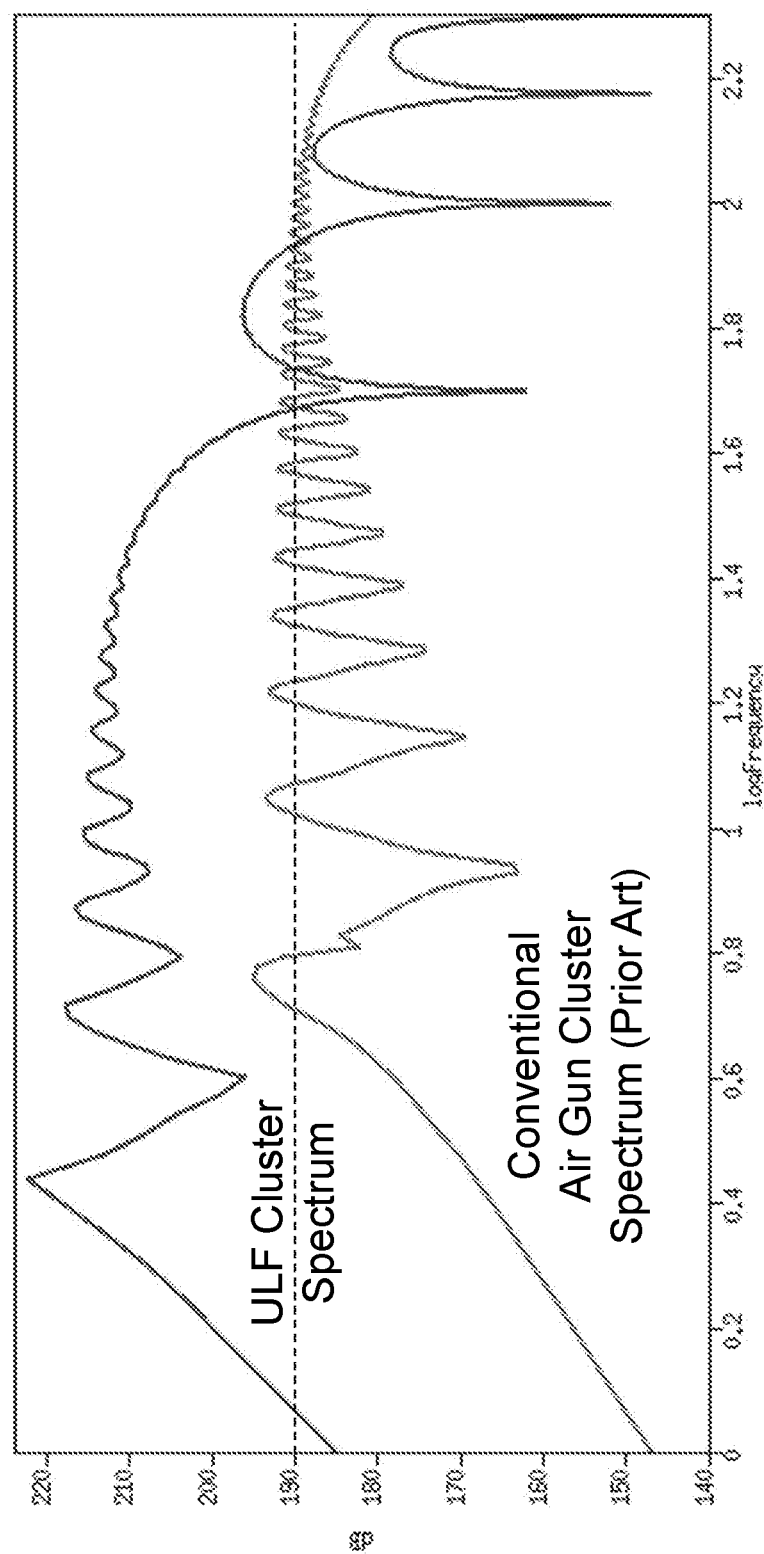
FIG. 6C is an embodiment of the spectra from the conventional air gun cluster of the prior art and the ULF cluster from FIGS. 6A and 6B.

As shown in FIG. 5A, in a conventional air gun cluster of in this example three air guns with each having a volume of 350 cu. in. for a total volume of 1050 cu. in. and an operating pressure of 2000 psi, a peak sound pressure level of about 8 barM is produced with a rise time of around 1.5 milliseconds and a peak-to-bubble ratio of 8:1. The bubble period is roughly 0.18 seconds. As shown in FIG. 5B, for the ULF cluster 90 having seven tuned pulse sources with each having a 20-foot firing chamber for a total cluster volume of 140,000 cu.in. at an operating pressure of 1000 psi, the peak sound pressure level is nearly tripled to about 22 barM, the rise time is 17 milliseconds, the peak-to-bubble ratio is lower at only 5:1, and the bubble period is roughly 0.43 seconds. The signatures from the air gun cluster and the ULF cluster 90 are shown overlaid in FIG. 5C. The frequency spectrum shown on a logarithmic scale for the air gun cluster is shown in FIG. 6A. The amplitude measured at a 30-kilometer offset at 1 Hz which is equal to zero on the logarithmic frequency scale is 150 decibels. As shown in FIG. 6B, the source amplitude of the ULF Cluster 90 at 1 Hz is 190 decibels. As is known in the art, source amplitude of 190 decibels is required to have adequate signal strength and sufficient signal to noise ratio to discern the seismic pulse from ocean noise at frequencies as low as 1 Hz. The air gun cluster as shown does not provide adequate signal strength and produces frequencies on the low end of around 7 Hz where 10 Hz is 1 and 100 Hz is 2 on the logarithmic scale. In the overlay of the frequency spectrum from the air gun cluster and ULF cluster 90 as shown in FIG. 6C, there is a sharp drop in high frequencies in the ULF cluster 90 where the output pulse has much less high frequency content than produced by conventional air guns.

The low frequency content of a seismic source is dependent on the volume of water that is displaced. The oscillating bubble that causes the water displacement depends on the volume times the operating pressure of the sources within a cluster or of any one source within the array. Experience from decades of using air guns shows that the low frequency limit for acceptable signal to noise at far offsets from the seismic source is one over twice the bubble period. The bubble period is determined by the volume and pressure of the source and the depth at which the source is deployed. The bubble period is given by the Rayleigh-Willis formula as follows where P and V are the pressure and volume and the depth is in meters. K is a constant which depends on the percent of the air that exits the source from the firing chamber. If 75% of the air exits the source when fired, then K is 2.06 when P is in PSI and V is given in cubic inch. Therefore, to achieve a 1 Hz signal at far offsets, the bubble period must be 500 milliseconds.

$$\text{Bubble period} = \frac{K(PV)^{1/3}}{(10 + \text{Depth})^{5/6}}$$

Figure 7B:
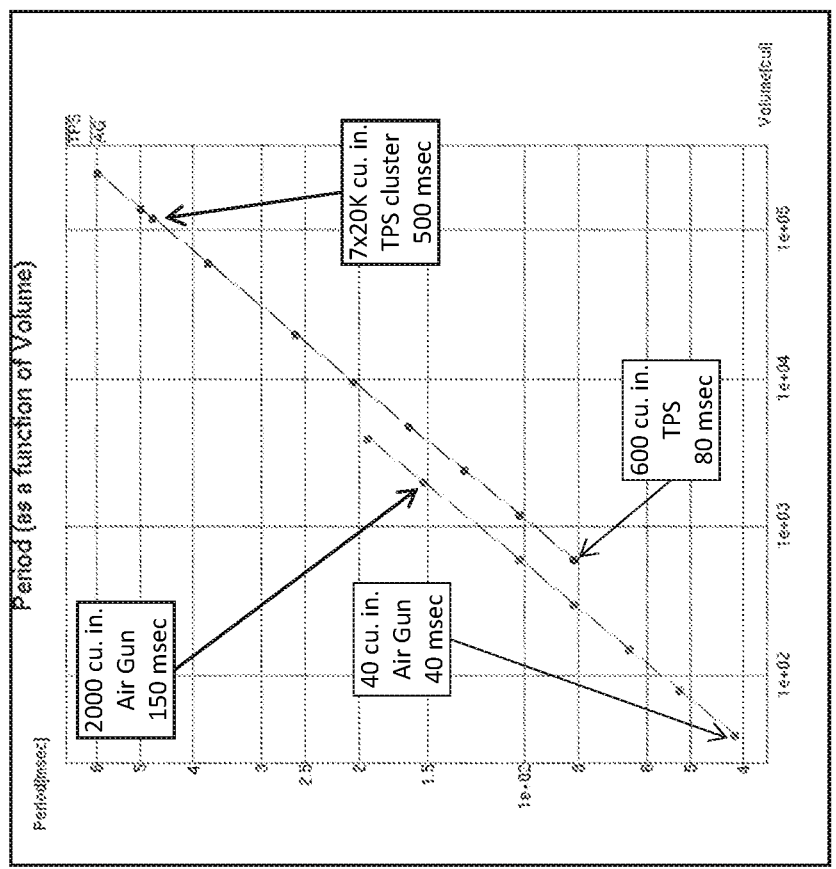
FIG. 7B is a graph showing the relationship of the bubble period at 30 km with respect to the volume of the seismic source for a single conventional air gun, a conventional air gun cluster, a single tuned pulse source, and a ULF cluster.
Figure 7A:
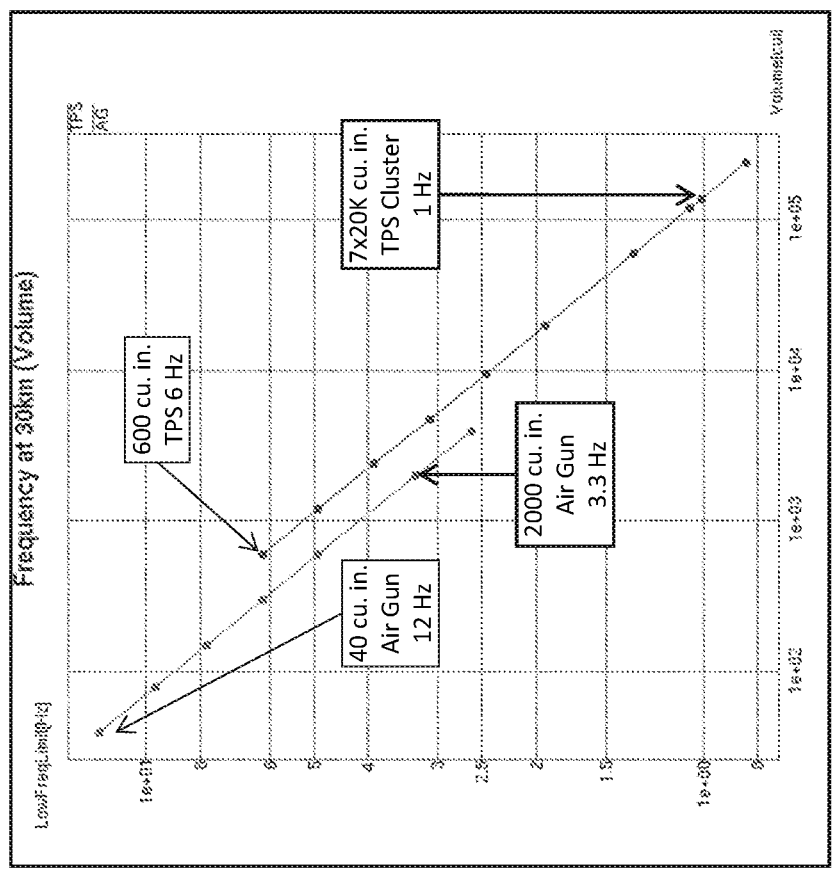
FIG. 7A is a graph showing the relationship of half the bubble frequency at 30 km with respect to the volume of the seismic source for a single conventional air gun, a conventional air gun cluster, a single tuned pulse source, and a ULF cluster.

Using the Rayleigh-Willis formula, and limiting the pressure to 1000 psi which is in the range of operating pressures for the tuned pulse source of the present invention, a volume of 140,000 cu. in. is required to achieve a bubble period of 500 milliseconds as shown in the chart providing a comparison of frequency to volume at a 30-kilometer offset in FIG. 7A. As shown a conventional air gun of the prior art having a volume of 40 cu. in. produces a signal at 12 Hz and a conventional air gun cluster having a volume of 2000 cu. in. produces a signal of 3.3 Hz. A single tuned pulse source (TPS) having a volume of 600 cu. in. produces a signal of 6 Hz and a ULF cluster 90 of seven TPS each having a volume of 20,000 cu.in. produces a signal of 1 Hz. In a comparison of the bubble period as a function of volume as shown in the chart in FIG. 7B, a conventional air gun of the prior art having a volume of 40 cu. in. produces a bubble period of 40 milliseconds and a conventional air gun cluster having a volume of 2000 cu. in. produces a bubble period of 150 milliseconds. A single tuned pulse source (TPS) having a volume of 600 cu. in. produces a bubble period of 80 milliseconds and a ULF cluster 90 of seven TPS each having a volume of 20,000 cu.in. produces the necessary bubble period of 500 milliseconds to achieve a signal at 1 Hz.

Figure 8A:
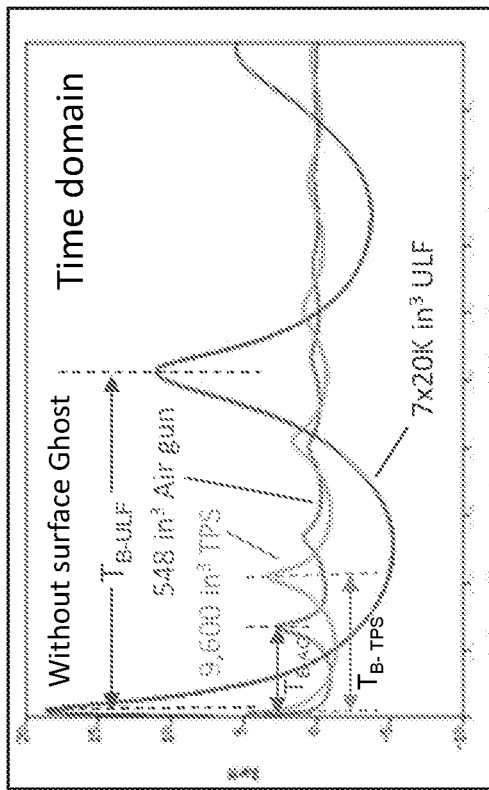
FIG. 8A is an embodiment of signatures with surface ghost for a single conventional air gun, a single tuned pulse source, and a ULF cluster.
Figure 8B:
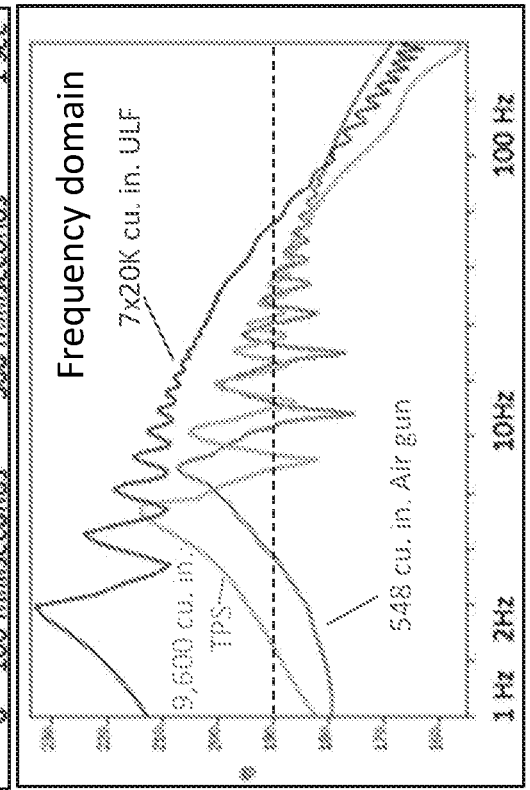
FIG. 8B is an embodiment of spectrum from the surface ghost signatures of FIG. 7A for the single conventional air gun, the single tuned pulse source, and the ULF cluster.
Figure 8C:
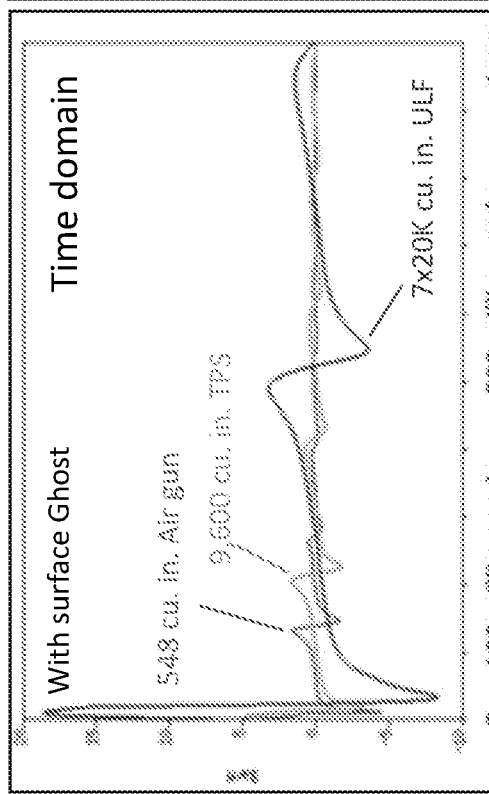
FIG. 8C is an embodiment of deghosted signatures from the signatures of FIG. 8A showing the bubble period at 30 km for a single conventional air gun, a single tuned pulse source, and a ULF cluster.
Figure 8D:
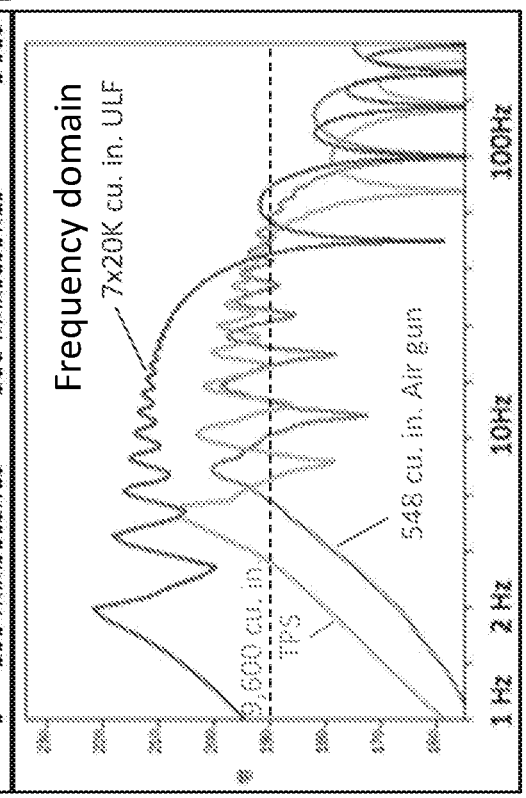
FIG. 8D is an embodiment of spectrum from the deghosted signatures from FIG. 8C for the single conventional air gun, the single tuned pulse source, and the ULF cluster.

As shown in FIG. 8A, using computer modeling and the Rayleigh-Willis formula signatures at different volumes are constructed for a conventional air gun of the prior art having a volume of 40 cu. in., a TPS having a volume of 9600 cu. in. and a ULF cluster 90 having a volume of 7×20,000 cu. in. or 140,000 cu. in. shown with the surface ghost in each signature. The frequency spectrum for the conventional air gun having a volume of 40 cu. in., the TPS having a volume of 9600 cu. in. and the ULF cluster 90 having a volume of 140,000 cu. in. are shown in FIG. 8B. The frequency spectrum shows the source amplitude at greater than 190 decibels at 1 Hz for the 140,000 cu. in. ULF cluster 90. The source amplitude at 1 Hz for the 40 cu. in. conventional air gun and for the 9600 cu. in. TPS is less than 160 decibels. In FIG. 8C, the deghosted signatures for the 40 cu. in. air gun, the 9600 cu. in. TPS, and for the 140,000 cu. in. ULF cluster 90 are shown. In FIG. 8D, the frequency spectrum for the deghosted signatures show the source amplitude for the ULF cluster 90 having a volume of 140,000 cu. in. at greater than 210 decibels at 1 Hz and at less than 180 decibels at 1 Hz for the 40 cu. in. conventional air gun and for the 9600 cu. in. TPS.

Figure 9A:
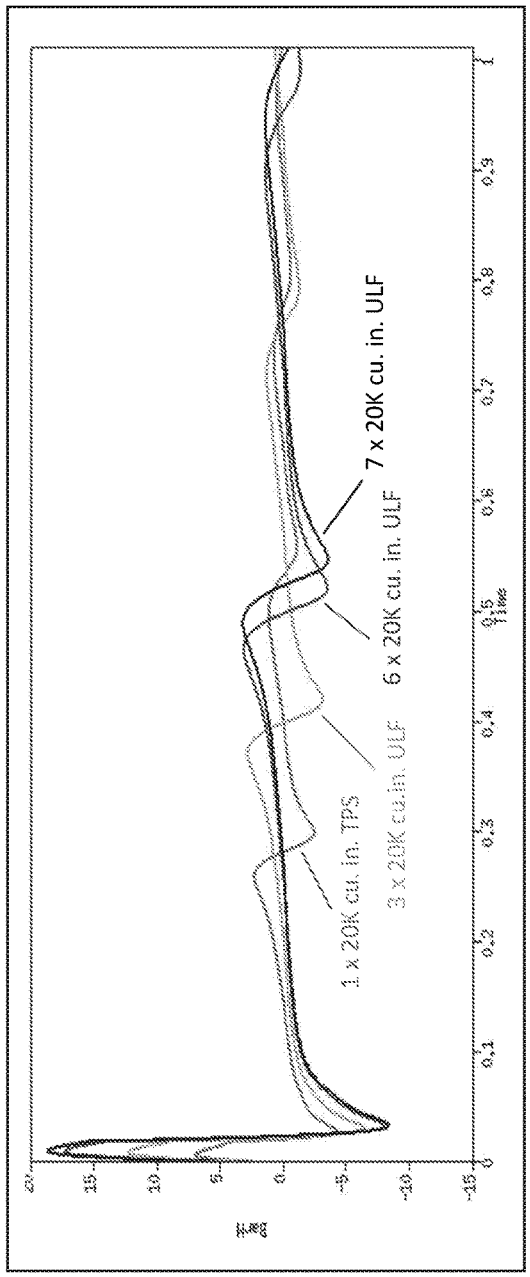
FIG. 9A is an embodiment of signatures with surface ghost for a single 1×20,000 in$^3$ tuned pulse source, a 3×20,000 in$^3$ ULF cluster, a 6×20,000 in$^3$ ULF cluster, and a 7×20,000 in$^3$ ULF cluster.
Figure 9B:
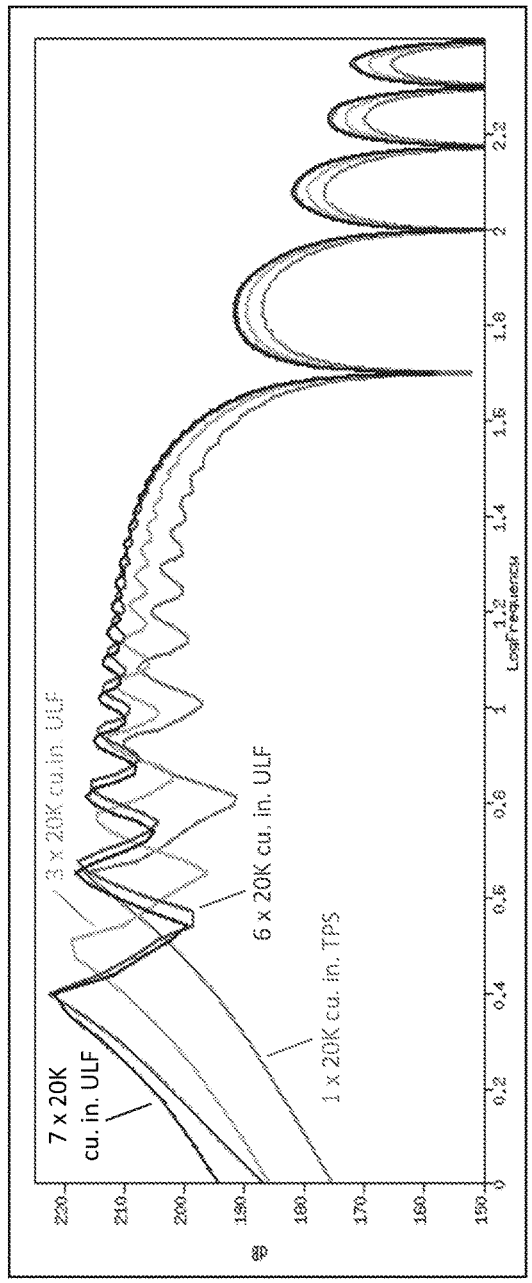
FIG. 9B is an embodiment of spectrum from the surface ghost signatures of FIG. 8A for the single 1×20,000 in$^3$ tuned pulse source, the 3×20,000 in$^3$ ULF cluster, the 6×20,000 in$^3$ ULF cluster, and the 7×20,000 in$^3$ ULF cluster.

As shown in FIG. 9A, using computer modeling and the Rayleigh-Willis formula signatures at different volumes are constructed for a ULF cluster 90 with each TPS having a volume of 20,000 cu.in. and a different number of sources in each cluster and the signature for a single TPS. As shown the rise time remains substantially constant while the peak sound pressure level and bubble period increases as the number of tuned pulse sources are increased. The increase in peak sound pressure level using more sources means a larger energy output of the cluster than of a single source. The energy output of a single 20,000 cu. in. TPS using the Carnot Formula and dependent on the depth of deployment is estimated at 15 meters to be 3.5 Megajoules and at 30 meters to be 3.1 Megajoules. For a 140,000 cu. in. ULF with seven TPS, the energy output at 15 meters is estimated to be 25 Megajoules and at 30 meters to be 22 Megajoules. As shown in FIG. 9B in the frequency spectrum from the signatures of FIG. 9A, the increased energy output using more sources increases the source amplitude from a single 20,000 cu.in. TPS that is less than 180 decibels at 1 Hz to over 190 decibels for a 140,000 cu. in. ULF cluster 90 with seven TPS. Of course, within a seismic source array any number of clusters with each cluster having a different number of sources are selected to meet the signal output characteristics and frequency content based on the environment, deployment depth and other requirements of the seismic survey. As shown a 60,000 cu. in. ULF cluster 90 with three TPS has a source amplitude of about 185 decibels at 1 Hz and a 120,000 cu. in. ULF cluster 90 with six TPS has a source amplitude of about 187 decibels at 1 Hz and over 190 decibels in the 2 Hz to 3 Hz range which may be the frequency range of interest for a ULF cluster 90 in some seismic surveys. What is not known in the prior art is a cluster that can achieve source amplitudes over 190 decibels at 1 Hz which can be done with the ULF cluster 90 of the present invention.

Figure 10A:
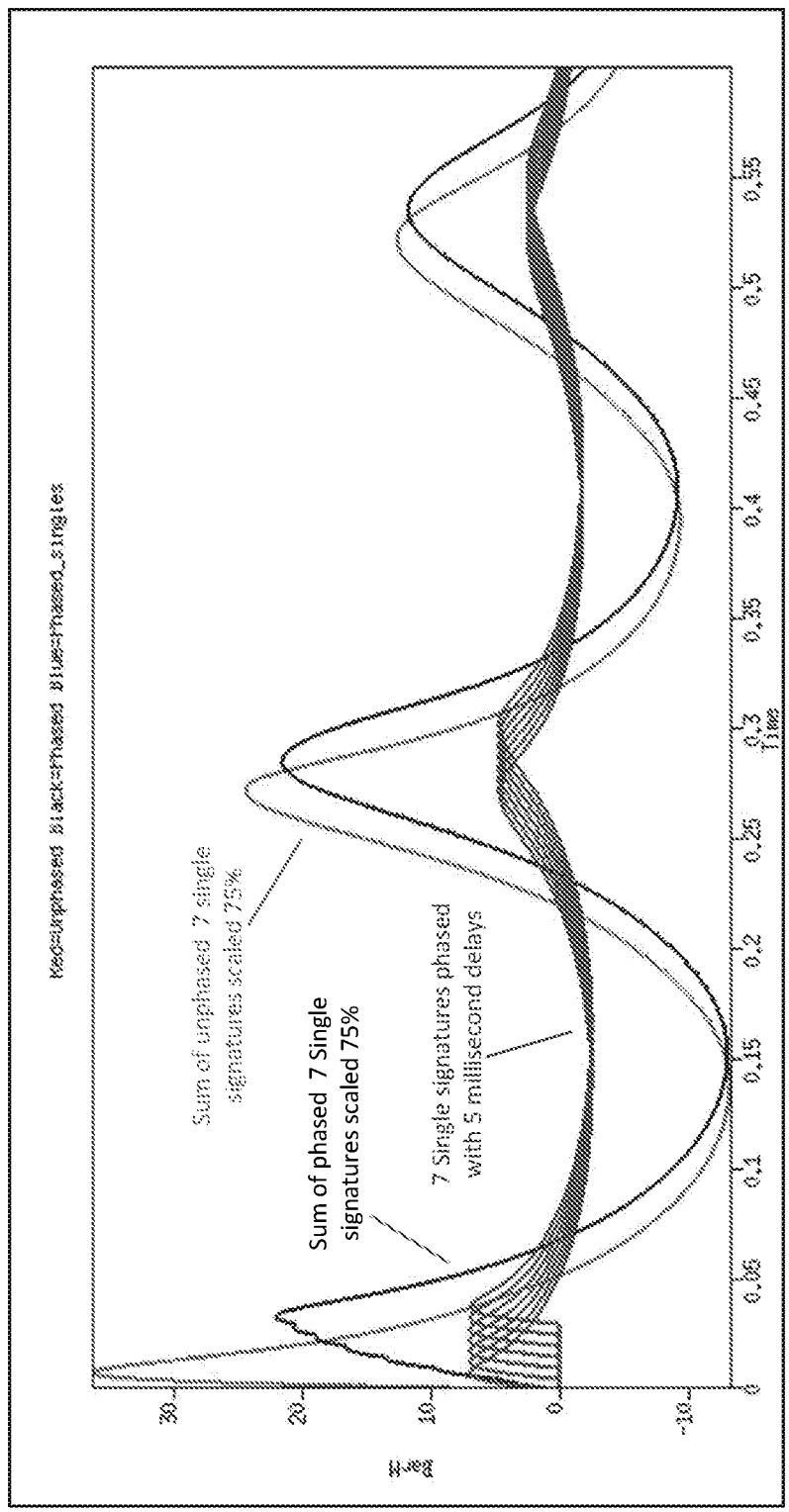
FIG. 10A is an embodiment of combined signatures of simultaneous firing of the tuned pulse sources within the ULF cluster, of combined phased signatures of firing each tuned pulse in secession with a 5-millisecond time delay, and a separate signature from each tuned pulse source fired with the 5-millisecond time delay in an embodiment of the ULF cluster of the present invention.
Figure 10B:
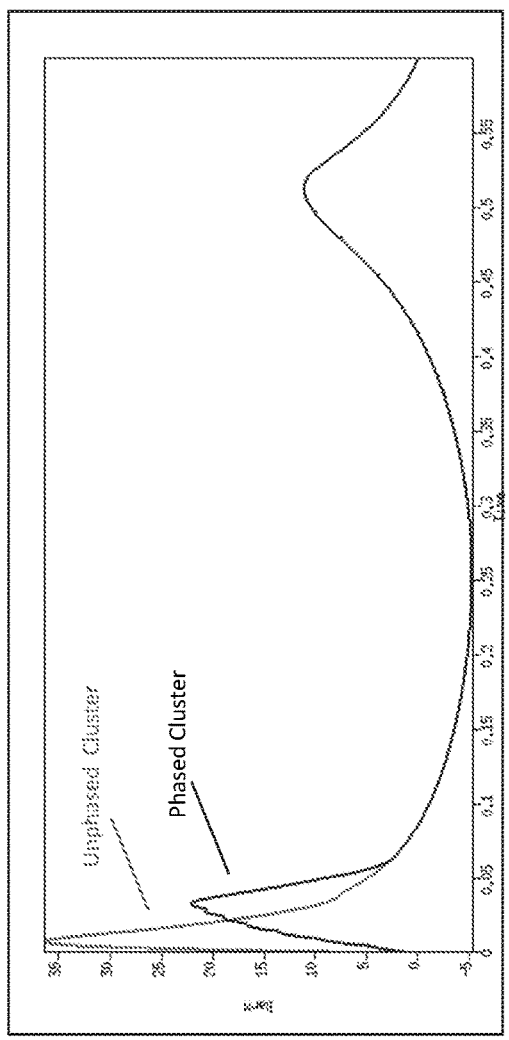
FIG. 10B is an embodiment of the combined signatures of simultaneous firing of the tuned pulse sources within the ULF cluster and the combined phased signatures of firing each tuned pulse in secession with a 5-millisecond time delay of FIG. 10A.
Figure 10C:
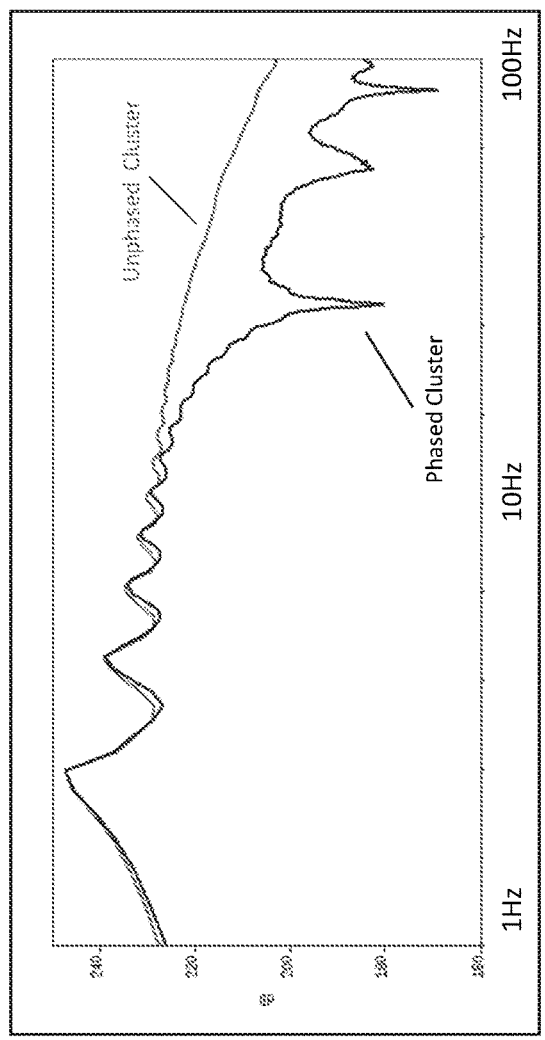
FIG. 10C is an embodiment of the spectrum from the combined signatures of simultaneous firing of the tuned pulse sources within the ULF cluster and the combined phased signatures of firing each tuned pulse in secession with a 5-millisecond time delay of FIG. 10A.

In embodiments of the present invention, the ULF cluster 90 the tuned pulse sources 60 within the cluster may be fired simultaneously or in order to broaden out the signal, a 5 to 10 millisecond delay in firing each tuned pulse source 60 is implemented using a firing control program. As shown in FIG. 10A, the combined signature of firing the tuned pulse sources 60 within the ULF cluster 90 simultaneously is shown. Also shown are the signal signatures from firing each tuned pulse source 60 consecutively with a 5-millisecond delay and the combined signature of these delayed signatures is also shown. The combined signature of the simultaneous firing of the tuned pulse sources 60 within the cluster which may be referred to as the "unphased cluster," has a peak sound pressure level of 36 BarM and a rise time of 20 milliseconds. The combined signature for the delayed firing of the tuned pulse sources 60, the "phased cluster" has a peak sound pressure level of 23 BarM and a rise time of 40 milliseconds broadening out the output signal and thereby reducing high frequencies. While there does not appear to be an increase in low frequency content by using delayed firing in the phased ULF cluster 90, the rise time is increased, the peak sound pressure level is reduced, the slope is reduced, and there is less environmental impact with the reduction in high frequencies. As shown in the example generated through computer modeling in FIGS. 10B and 10C, the rise time increases by a factor of 4, the peak sound pressure level decreases by a factor of 40%, the slope decreases by a factor of 8 and the high frequency content above 10 Hz reduces by over 20 decibels. Therefore, by adding phased firing of the tuned pulse sources with the ULF cluster, the characteristics of the signal output may be adjusted. Further, by selecting a specific order to the firing of the tuned pulse sources within the ULF cluster 90 the rise time and slope may be increased while decreasing high frequency content as desired.

Figure 11:
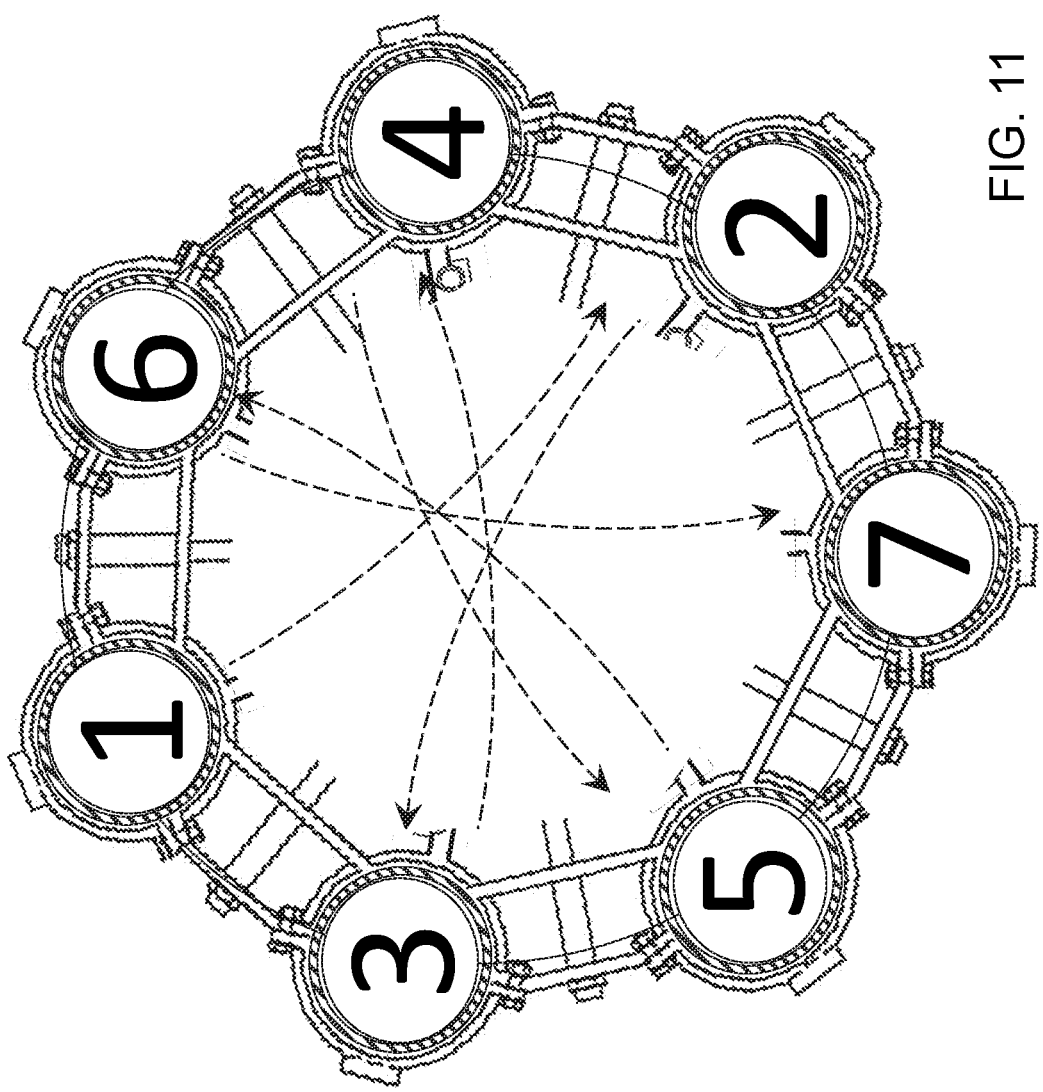
FIG. 11 is a diagram of a firing sequence in an embodiment of the ULF cluster of the present invention.

As shown in FIG. 11, in an embodiment of a specific firing order, a delay of for example 5-milliseconds is added between each firing with a first TPS being fired, then a second TPS that is across and at the furthest distance from the first TPS is fired, then a third TPS that is across and at the furthest distance from the second TPS is fired, then a fourth TPS that is across from and at the furthest distance from the third TPS is fired, a fifth TPS that is across and at the furthest distance from the fourth TPS is fired, a sixth TPS that is across and at the furthest distance from the fifth TPS is fired and then a seventh TPS that is across and at the furthest distance from the sixth TPS is fired. While firing air guns and then simultaneously firing all air guns within a cluster within an array with short delays in between is known and sometimes referred to as "Pop-Corn" firing, what is not known in the prior art is firing the sources within a single cluster at different times and in a specific order to characterize the signal output. The ULF cluster 90 and firing circuitry of the tuned pulse source 60 of the present invention provides this unique benefit to enhance the signal output of a specific cluster within an array of sources.

Various configurations of tuned pulse sources 60 having different diameters and volumes are within the scope of the present invention and therefore the number and configuration of tuned pulse sources 60 may be selected as desired. For example, tuned pulse sources 60 having twice the diameter and shorter firing chambers could be selected to reduce the overall length of the seismic source while still achieving for example the desired volume of 140,000 cu. in. to reach the required source amplitude of 190 decibels at 1 Hz. In other embodiments, the diameter of the tuned pulse sources 60 and length of the firing chamber 52 may be selected to tune the ULF cluster 90 to a specific frequency content and signal output having the desired signal characteristics for the rise time and slope as required by the seismic survey with any structural design or configuration of the source and ULF cluster 90 being within the scope of the present invention. For example, in a further embodiment of the cluster bracket 100 up to twelve tuned pulse sources 60 are supported and are set at an equidistance from the center point of the cluster, as shown in FIG. 12A.

Figure 12A:
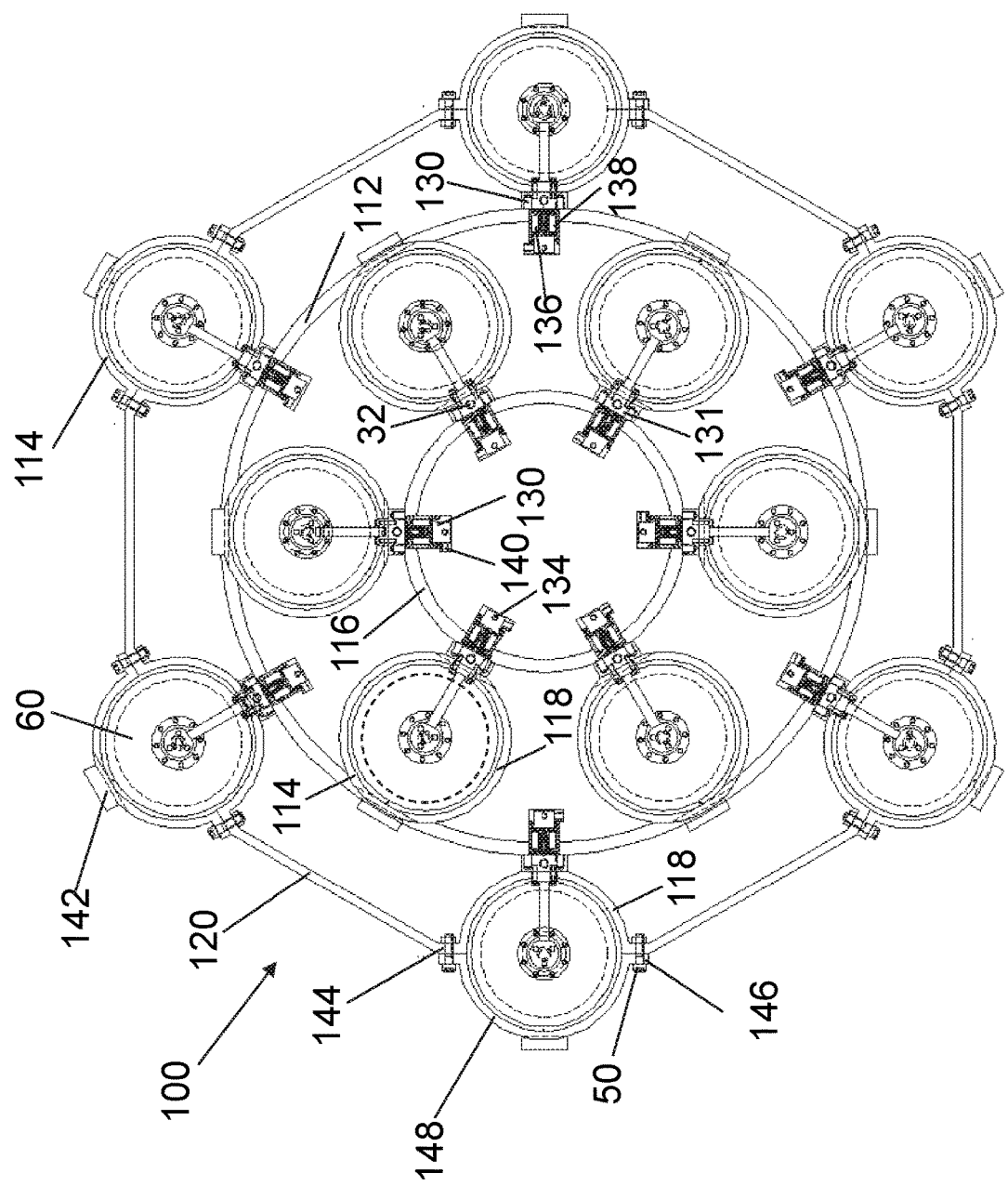
FIG. 12A is a further embodiment of a cluster bracket for holding twelve tuned pulse sources in an embodiment of the present invention.
Figure 12B:
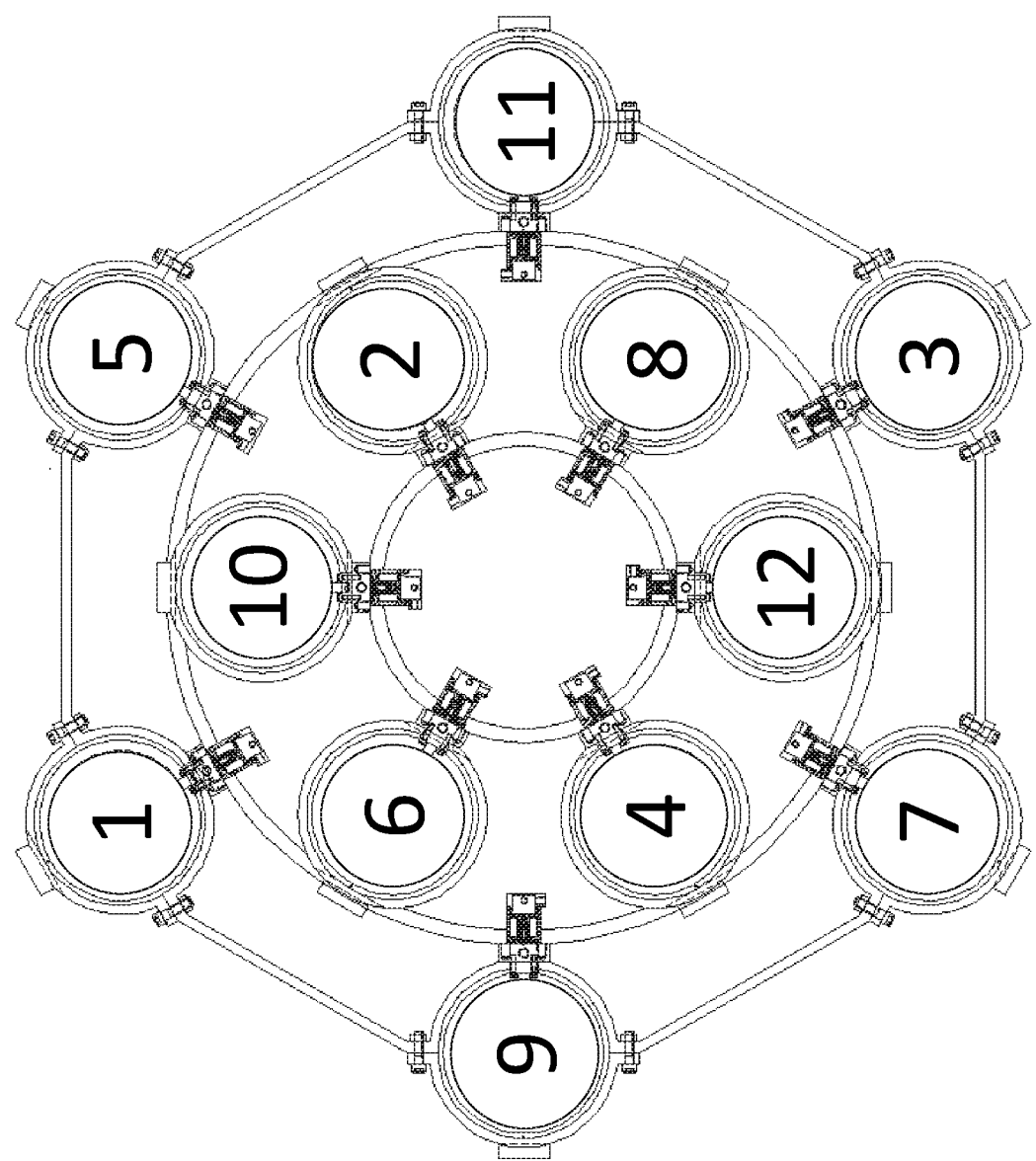
FIG. 12B is a diagram of a firing sequence in the further embodiment of the ULF cluster of the present invention.

As shown in FIG. 12B, an embodiment of a specific firing order for the ULF cluster 90 having twelve tuned pulse sources is shown. A delay of for example 5-milliseconds is added between each firing with a first TPS being fired from the outer ring, then a second TPS that is along the inner ring and at a diagonal from the first TPS is fired, then a third TPS that is along the outer ring and in-line with the second TPS is fired, then a fourth TPS that is along the inner ring and at a diagonal from the third TPS is fired, then a fifth TPS that is along the outer ring and at a diagonal from the fourth TPS is fired, then a sixth TPS that is along the inner ring and at a diagonal from the fifth TPS is fired, then a seventh TPS that is along the outer ring and in-line with the sixth TPS is fired, then the eighth TPS that is along the inner ring and at a diagonal from the seventh TPS is fired, then the ninth TPS that is along the outer ring and diagonal from the eighth TPS is fired, then the tenth TPS that is along the inner ring and at a diagonal from the ninth TPS is fired, then the eleventh TPS that is along the outer ring and diagonal from the tenth TPS is fired, and then the twelfth TPS that is along the inner ring and at a diagonal from the eleventh TPS is fired. The relationship of a TPS to another TPS within the cluster bracket 10 or 100 as across, in-line diagonal, or at a distance is based on the orientation of the diagrams in FIGS. 11 and 12B to provide examples and is not in any way limiting to a specific firing sequence of all or any number of TPS within the cluster bracket 10, 100. Any firing sequence implemented within a cluster using the cluster bracket 10, 100 is within the scope of the present invention.

As shown in FIG. 12A, the dual ring-shaped cluster bracket 100 that supports up to twelve tuned pulse sources 60 is designed with a series of six clamps 114 and saddle-like supports 118 for six tuned pulse sources 60 positioned in-between a central hub 116 and an inner circular frame 112. Along the inner circular frame 112 and between each clamp 114 and support 118 a supply mounting bracket 131 is welded to the inner circular frame 112 to extend outward and provide support for supply bracket 130 that is attached to a support 118 with a mating clamp 114 to support six more tuned pulse sources 60. For each of the outer supports 118, a frame piece 120 extends and is welded between each support 118. Each external frame piece 120 has an angular end portion 144 to form the ring-shaped outer frame. A flange 146 extends from either side of the semi-circular body 148 of the clamp 114. The flange 146 for each clamp 114 is placed on the angled end portion 144 to provide a flat surface for one or more bolts 150 to be used to secure each semi-circular clamp 114 to each semi-circular support 118 to surround and hold the firing chamber 52 of a tuned pulse source 60.

A supply mounting bracket 131 is also welded to the central hub 116 to support a supply bracket 130 for each of the six internal tuned pulse sources 60 supported between the central hub 116 and the inner circular frame 112. Each supply bracket 130 aligns and supports each compressed air supply conduit 32 and the electrical cable conduit 34 for each tuned pulse source 60. Each supply bracket 130 is formed with an extension support 136 having semi-circular cutouts for the air supply conduit 32 and the electrical cable conduit 34. The extension support 136 is welded to the supply mounting bracket 131 with the mating conduit block 138 having similar semi-circular cutouts. The mating conduit block 138 is affixed to the extension support 136 using a bolt 140 or another fastener.

The ring-shaped cluster bracket 10 holding up to seven tuned pulse sources 60 and the dual ring-shaped cluster bracket 100 holding up to twelve tuned pulse sources 60 are structurally designed to support large volume tuned pulse sources 60 with two or three cluster brackets 10, 100 being used for firing chambers longer than for example 1.0 m (3.3 feet). The cluster bracket 10, 100 strongly holds the tuned pulse sources 60 in a fixed circular configuration for marine seismic exploration. The circular shape of the cluster bracket 10, 100 provides for the tuned pulse sources 60 to be clustered with a reduction in distance between any two sources in order to have the signal output coalesce and form a large almost spherical shaped bubble. In order to have coalescing of the bubbles, the distance between each of the tuned pulse sources is set by the radius from the center of the cluster to the central point of each tuned pulse source with the radius having a maximum length of twice the bubble radius of each individual source when fired individually. The bubble radius is set by the volume of the firing chamber, the operating pressure of the tuned pulse source, and the depth in which the tuned pulse source is deployed. The clamps 14, 114 provide holding points for two to as many as twelve tuned pulse sources 60 that have firing chambers 52 that may range from 600 cu. in. to as large as 40,000 cu. in. in volume. The present invention provides for the length of firing chambers 52 of the tuned pulse sources 60 of the ULF cluster 90 to be selected to tune the rise time of the output pulse to a desired length of approximately 30.5 cm (12 in) of length for each millisecond of output pulse rise time. Accordingly, as an example an approximately 3.0 m (10 ft) long firing chamber will cause a rise time of about 10 milliseconds and an approximately 6.0 m (20 ft) long firing chamber will cause a rise time of about 20 milliseconds. To hold multiple long tuned pulse sources 60 in a closely spaced cluster the present invention utilizes the strong circular wheel-like frame with a series of source holding points that use as many clamps 14, 114 and supports 18, 118 as are required for the number of tuned pulse sources 60 within the cluster.

Figure 13:
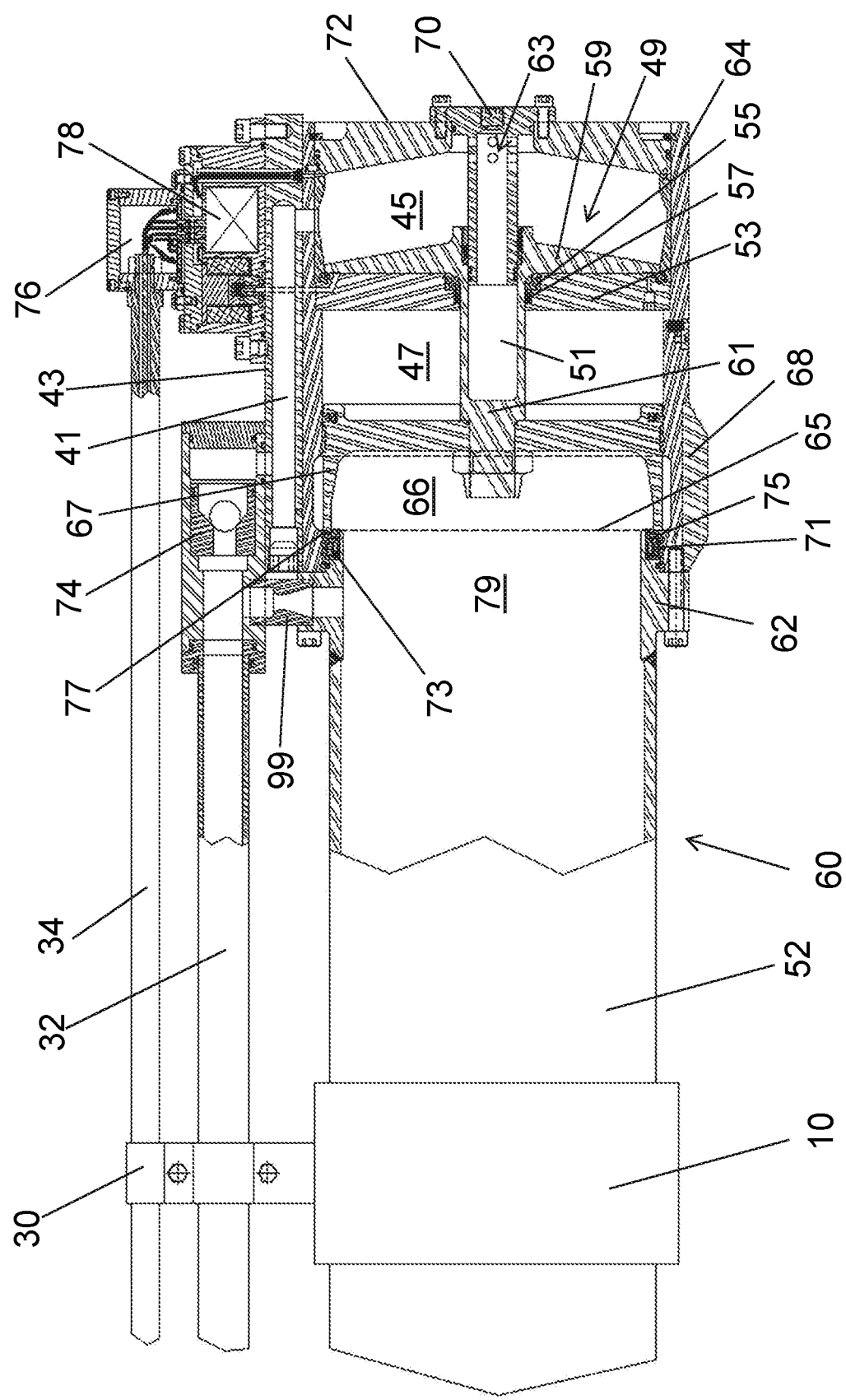
FIG. 13 is a longitudinal partial cross-sectional view of an embodiment of a tuned pulse source in an embodiment of the present invention.

In embodiments of the cluster bracket 10 holding up to seven tuned sources, depending on the length of the firing chamber 52 and the number of tuned pulse sources 60 within the ULF cluster 90, the hub 16 and spokes 26 may not be required for every cluster bracket 10. For example, for a longer firing chamber of 6.0 m (20 ft), a first cluster bracket 10 having the hub 16 and spokes 26 is stationed close to the outlet ports 66 as shown in FIG. 13. This first cluster bracket 10 is subjected to the strong repelling forces generated between the tuned pulse sources 60 when any tuned pulse source 60 is fired and the much stronger repelling forces when all are fired simultaneously, so a strong central hub 16 with a sufficient number of strong stainless-steel spokes 26 spaced radially provide the needed additional strength at the outlet ports 66 to secure the ULF cluster 90. The second cluster bracket 10 as shown in FIG. 3 and even a third cluster bracket 10 if necessary may only require lighter and thinner spokes 26 extending from a smaller central hub 16 sufficient to provide the necessary radial stabilization and thereby reducing the overall weight of the ULF cluster 90. The outer welded frame pieces 20 and the inner braces 22 may also be of a greater thickness and stronger than the frame pieces 20 and braces 22 used in the cluster brackets 10 that are more remote from the outlet port 66 providing flexibility in the design and materials of the cluster bracket 10, 100 to meet the structural requirements for the number of tuned pulse sources 60 used within the ULF cluster 90 and reduce weight of the overall cluster for easier deployment from a vessel. The circular diameter of the cluster bracket 10 may be larger or smaller depending on the size of the tuned pulse source, for example being in a range of from about ½ meter to two meters in diameter. In embodiments, the radial distance to any tuned pulse source may be in a range from ½ meter to a meter for example.

When fired, the tuned pulse sources emit very powerful and sharp expanding air bubbles which can cause damage to the compressed air supply lines and electric cables which feed compressed air and electric power and communications to the tuned pulse sources 60. The air supply lines and electric cables are connected to the protective conduits 32 and 34 that are made from strong stainless-steel pipes that extend along the firing chamber 52 and are supported within the supply bracket 30. Additional supports (not shown) that are attached to the firing chamber 52 are provided to support the protective conduits 32 and 34 when firing the tuned pulse source 60 without a cluster bracket 10, 100. The compressed air supply line is attached to the pneumatic fitting 80 of the air supply conduit 32 and the cable harness 84 electric cables are attached to the electrical connector 82 on the end of the electrical cable protective conduit 34. The air supply conduit is connected to the air distribution valve assembly 74 that supplies compressed air separately to the operating chamber 45 and the firing chamber 52. The air distribution valve assembly 74 directs air through bore holes 41 within a backbone 43 that is vacuum brazed or bolted to the main housing 64 to fill the operating chamber 45. For the firing chamber 52 air flow is directed through an air passage fitting 99 as described herein.

As shown in FIG. 13, the main housing 64 of the tuned pulse sources encloses an operating chamber 45 and an air cushion chamber 47 that are separated by a bulkhead 53. A shuttle assembly 49 with a hollow shaft 51 extends through the bulkhead from the operating chamber 45 and into the air cushion chamber 47. Shaft seals 55 and bearings 57 seal the operating chamber 45 from the air cushion chamber 47 and provide for the hollow shaft 51 to slide freely through the bulkhead 53. The hollow shaft 51 has an operating flange 59 that is attached to the shaft 51 to align in a closed position against the bulkhead 53 within the operating chamber 45. A cup-shape flange 67 is installed at the end of the hollow shaft 51 within the air cushion chamber 47. As shown in FIG. 13, the tuned pulse source 60 is in a closed ready to fire position with the cup-shaped flange 67 sealed against the firing seal retainer assembly 71 along the edge 65 of the outlet ports 66. The firing seal retainer assembly 71 is installed along an outer groove of the firing chamber flange 62 and has a spring loaded back ring 73 that compresses the firing seal 75 against the inner rim 77 of the cup shaped flange 67 to seal the shuttle assembly 49 against the firing seal 75. As shown the throat area 79 that is formed by the firing chamber flange 62 has little or no restrictions or projections that would restrict air flow from the firing chamber 52 and out through the outlet ports 66 thereby reducing any turbulence or hissing that may produce undesirable high frequencies.

The tuned pulse source 60 of the present invention is unlike previous conventional air gun designs in that it does not have an opening through the end of the shaft, through which the firing chamber 52 is filled with compressed air. Instead, the tuned pulse source 60 of the present invention has a hollow shaft 51 with a closed end 61 within the air cushion chamber 47. While the hollow shaft 51 is still filled with compressed air, there is no opening to direct air flow to fill the firing chamber 52. The hollow shaft 51 is filled with compressed air through multiple holes 63 within the shuttle guide post 115 of the shaft 51 in the operating chamber 45. By filling the shaft 51 and shuttle guide post 115, the compressed air acts to push on the closed end 61 of the shuttle bore to close the shuttle assembly 49 to the set and ready to fire position thereby sealing the operating flange 59 to the operating seal 107 and the cup shaped flange 67 to the firing seal 71. The compressed air within the operating chamber 45 also acts on the cross-sectional area of the outside diameter of the shuttle shaft 51 and the operating flange 59 to maintain the shuttle assembly 49 in the closed and ready to fire position.

Figure 14:
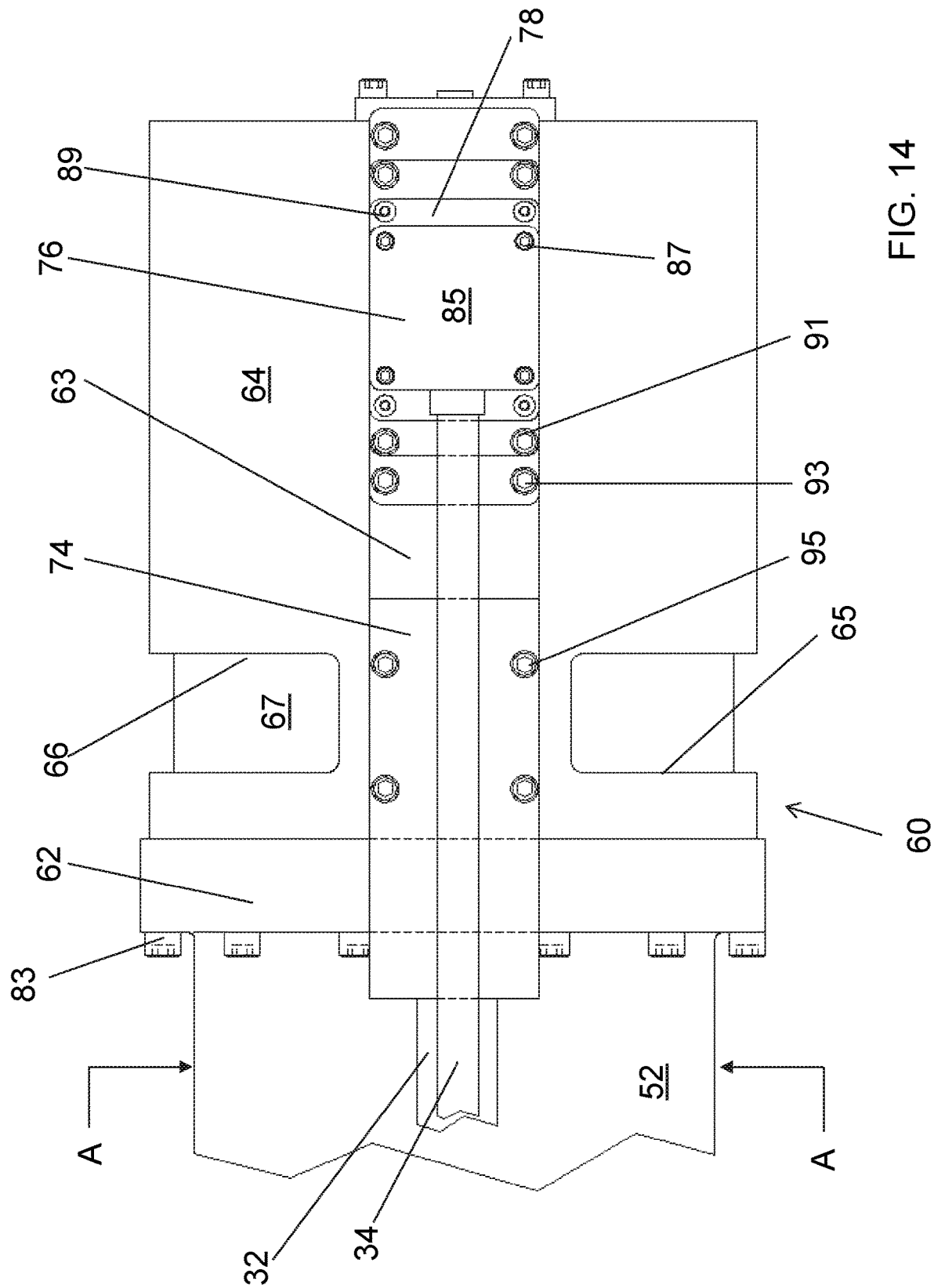
FIG. 14 is a partial top view of an embodiment of the tuned pulse source of the present invention with the communications connector assembly and the distribution valve assembly mounted on the top of the tuned pulse source.

As shown in FIG. 14, in the closed position, the cup shaped firing flange 67 covers the outlet ports 66 and seals at the edge 65 of the ports 66 providing zero acceleration distance which provides a wider port exit area and increased coupling of air to water when the tuned pulse source 60 is fired over port area designs in air guns of the prior art. The top view of the tuned pulse source 60 shows the backbone 43 mounted to the main housing 64 and air distribution valve assembly 74 extending over the firing chamber flange 62 that using bolts 83 attaches the firing chamber 52 to the main housing 64 of the tuned pulse source 60. The air supply conduit 32 is attached to the air distribution valve assembly 74 and the electrical cable conduit 34 is attached to the integrated communications connector 76. The integrated communications connector 76 has a cover 85 that is attached with a series of screws 87 to access and repair the electronics within the communications circuit. A set of small bolts 89 attaches the integrated communications connector 76 to the solenoid operated valve 78. Another series of bolts 91 attaches a cover that provides access to the solenoid operated valve 78 and another series of bolts 93 attaches the solenoid operated valve to the backbone 43. This provides for access or the removal and replacement of just the integrated communications connector 76, access to the solenoid operated valve 78 or removal and replacement of both the integrated communications connector 76 and the solenoid operated valve 78 as needed for repair. The air distribution valve assembly 74 is connected to the backbone 43 using another series of bolts 95 and may also be removed and replaced as needed by first removing the integrated communications connector 76. The communications, electronics and air supply may therefore be easily removed from the tuned pulse source 60 to quickly and efficiently replace a failed component within these circuits or to replace the tuned pulse source 60 due to failure. While the orientation of the components of the tuned pulse source 60 is referred to herein as on top, the tuned pulse source 60 is operational with the components in an orientation.

As shown in FIG. 15 in cross-section A-A of the tuned pulse source 60 from FIG. 14, the closed end 61 of the shaft 51 of the shuttle assembly 49 is shown in the center of the main housing 64. The cup-shaped flange 67 of the shuttle assembly 49 is secured to the closed end 61 using a nut 97. The integrated communications connector 76 with the electrical cable conduit 34 is shown above and behind the air distribution valve assembly 74 that is mounted to the backbone 43. The air supply conduit 32 that extends out from the air distribution valve assembly 74 and the bore holes 41 within the backbone 43 are also shown. Within the air distribution valve assembly 74, the air passage fitting 99 to separately fill the firing chamber 52 may be made with various shaped orifices 101 with the preferred shape being somewhat an hour glassed shape with smooth rounded surfaces to prevent whistling and turbulence which may cause unwanted high frequency noise. The orifice 101 may be of different diameters to match the air filling rate required for the volume of the firing chamber 52 that may range in volume from for example small 600 cu. in. to large 20,000 cu. in. Because it is important to have the proper orifice 101 size for proper flow rate, embodiments of the air passage fitting 99 may come with different orifice 101 sizes corresponding to the volume of the firing chamber 52.

Figure 16A:
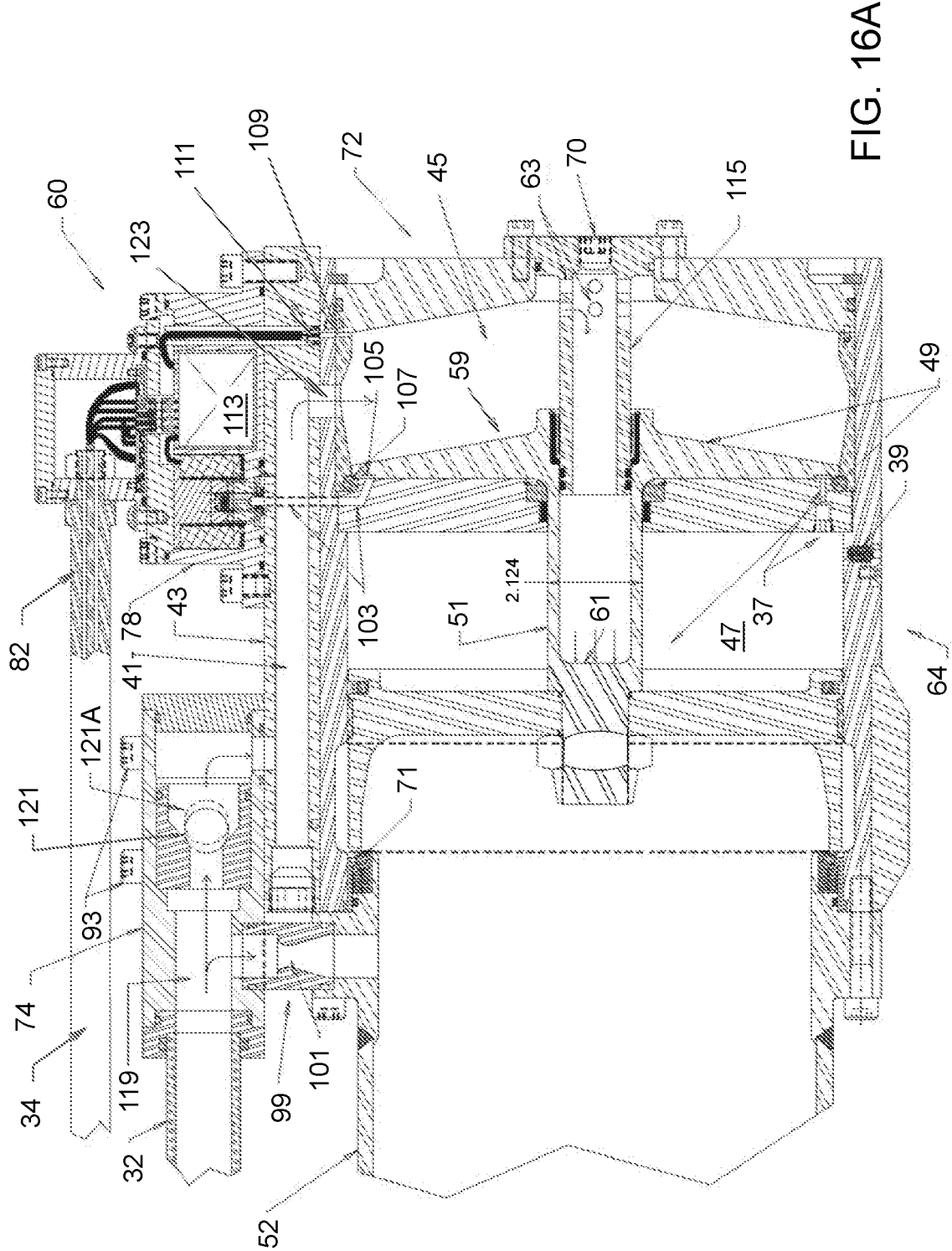
FIG. 16A is a longitudinal cross-sectional view of an embodiment of the main housing in a closed ready-to-fire position in an embodiment of the tuned pulse source of the present invention.
Figure 16B:
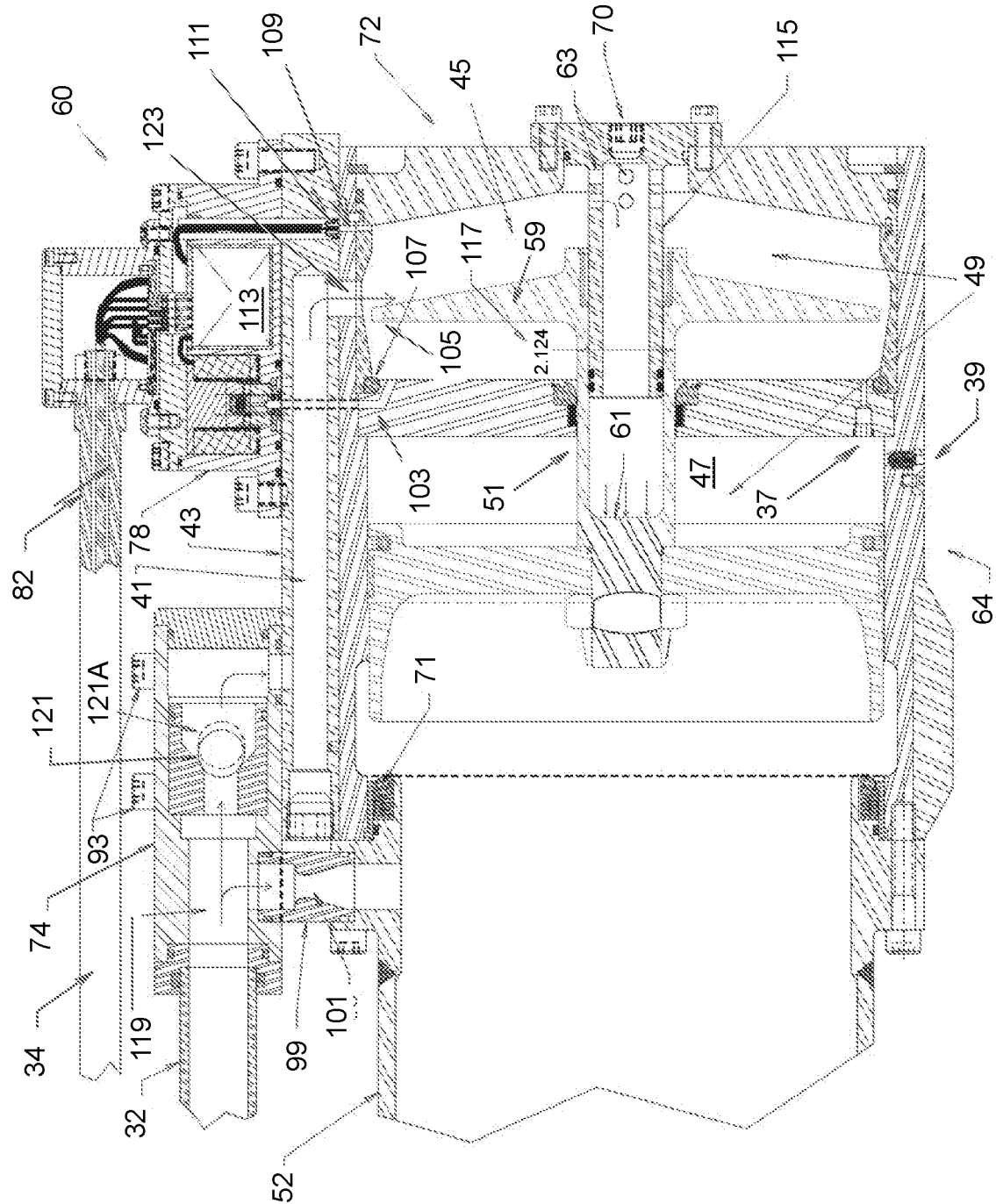
FIG. 16B is a longitudinal cross-sectional view of an embodiment of the main housing in an open fired position in an embodiment of the tuned pulse source of the present invention.

As shown in FIG. 16A, in embodiments of the present invention the tuned pulse source 60 for releasing bursts of compressed air into the water as a sound source for marine seismic exploration is fired using an electrically operated solenoid valve 78. When an electric signal is applied solenoid valve 78 opens to release rapidly flowing compressed air from the bore hole 41 within the backbone 43 through a short air trigger passage 103 and into an annular groove 105 that surrounds the face of the operating flange 59. The air trigger passage 103 is of a substantially shortened length as compared to conventional air guns of the prior art and extends directly through the backbone 43 to provide for more precise firing of the tuned pulse source 60. The rapid release of air to the face of the operating flange 59 triggers the tuned pulse source 60 to fire by breaking the seal between the outside diameter of operating flange 59 and operating seal 107 moving the shuttle assembly 49 and thereby breaking the seal of the cup-shaped flange 67 to the firing seal 71. The cross-sectional area of cup shaped flange 67 is forcefully pushed by the air pressure within the firing chamber 52 and air is immediately released through the outlet ports 66. As shown in FIG. 16B, when firing the shuttle assembly 49 accelerates the operating flange 59 compressing the air within the operating chamber 45 and creating a pressure spike which enters the time break transducer passage 109 causing a time break transducer 111 installed at the passage 109 to produce a signal to the control circuit 113 within the integrated communications connector 76 that the tuned pulse source 60 has fired. At the base of the main housing 64 an air vent passage 37 is provided to release air from the operating chamber 45 to the air cushion chamber 47, thus allowing the air pressure in the annular groove 105 to be at ambient water pressure when the operating flange 59 has returned to the set position. A check valve 39 at the base of the air cushion chamber 47 is positioned for outward flow of air and to vent any water from the air cushion chamber 47.

Figure 17:
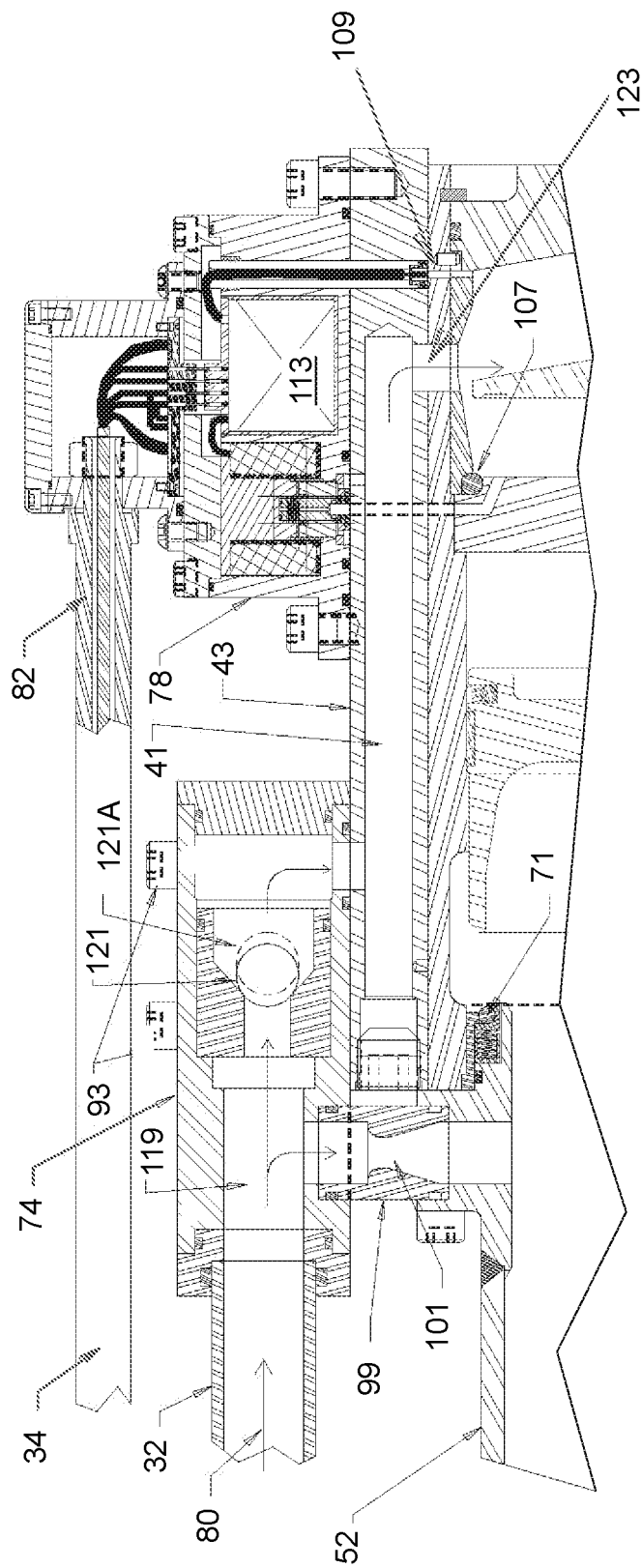
FIG. 17 is a portion of the longitudinal cross-sectional view of an embodiment of the tuned pulse source illustrating the communications connector assembly, the distribution valve assembly, and the air passage of the back bone in an embodiment of the present invention.
Figure 18:
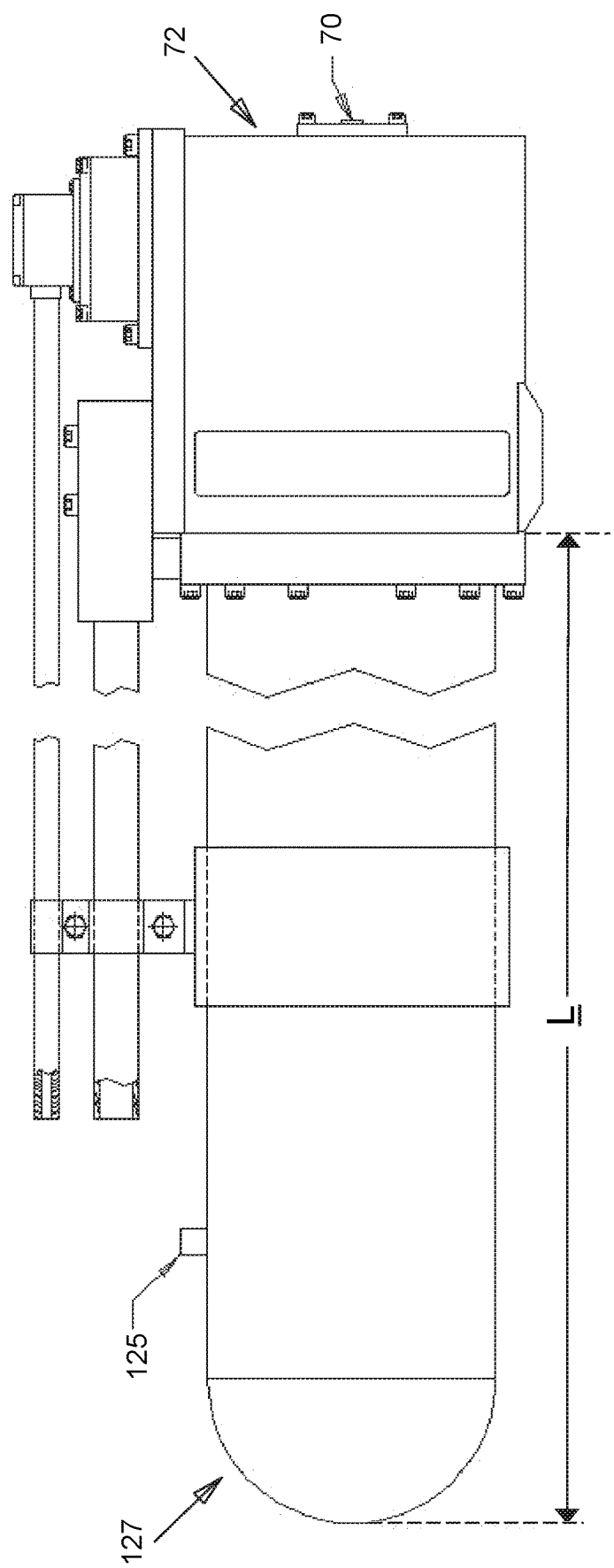
FIG. 18 is a side elevation view of an embodiment of the tuned pulse source of the present invention illustrating that different lengths of firing chambers may be attached to embodiments of the tuned pulse source to tune the rise time based on the firing chamber length.

The tuned pulse source 60 of the present invention is very different from conventional air guns that utilize a compressed air input located on and through the top of the operating chamber and through the shaft of the shuttle assembly and thereby provide only a single conduit to fill both the operating chamber and firing chamber with compressed air. The tuned pulse source 60 of the present invention utilizes the air distribution valve assembly 74 to transmit and distribute compressed air from the air supply line of the vessel to the operating chamber 45 and separately to the firing chamber 52. As shown in FIG. 17, the air conduit 32 is attached to a distribution block 119 of the air distribution valve assembly 74 to split the flow of compressed air from the air supply line between the operating chamber 45 and the firing chamber 52. To fill the operating chamber 45, the highly compressed air pushes check valve 121 to an open position designated as 121A to allow air flow into the bore 41 of the brazed in place stainless steel backbone 43 and through the inlet opening 123 to the operating chamber 45. The bore hole passages 41 are large as compared to previous air guns to prevent any significant pressure drop in filling the operating chamber 45. Because the operating chamber 45 has a smaller volume it fills more rapidly than the firing chamber 52 and as pressure within the operating chamber 45 exceeds the pressure in the filling firing chamber 52, the operating flange 59 is pressed to a closed position and sealed to the operating seal 107 and the cup shaped flange 67 is sealed to the firing seal 71 closing the outlet ports 66. As the desired operating pressure that is set by an air compressor on the vessel is reached, pressure within the operating chamber 45 closes the check valve 121 and the tuned pulse source 60 is in a closed and ready to fire position. The operating pressure in embodiments of the tuned pulse source of the present invention may be in a range from 400 psi to 1000 psi. Pressure sensors on the tuned pulse source 60 may monitor pressure within the operating chamber 45 and firing chamber 52.

The tuned pulse source 60 of the present invention provides important safety features to prevent an erratic discharge of air from the tuned pulse source 60 on deck or during deployment or retraction from the water which may cause damage and injury. In conventional air guns, after firing, a vent valve on the vessel is opened to vent to atmosphere the air supply line which feeds compressed air into the air gun. When larger firing chambers on these air guns are vented from and through the shuttle assembly and operating chamber as part of air gun operation, the compressed air at times is vented from the air gun at a rate so fast that the pressure in the operating chamber lowers to the point where the pressure within the operating chamber is lower than the pressure within the firing chamber causing the air gun to unintentionally self-fire. With the very large firing chambers 52 used on the tuned pulse source 60 for creating seismic sound pulses of very low frequencies such as 1 Hz or lower the danger of very large firing chambers under pressure on the deck of an exploration vessel is great because the blast from such large firing chambers could cause damage to equipment or serious injury to personnel. When the tuned pulse source 60 of the present invention fires and releases the air from the firing chamber 52 into the surrounding water, the check valve 121 remains closed with compressed air trapped within the operating chamber 45. When the vent valve on the vessel for the air supply line is open to release pressure, the compressed air within the firing chamber 52 of the tuned pulse source 60 will be vented back through the air passage fitting 99 and out through the air supply line to the vent valve on the exploration vessel. As the firing chamber 52 is emptying, the tuned pulse source 60 cannot self-fire, thus making the operation safer. The operating chamber 45 remains filled with compressed air when the tuned pulse source 60 is to be removed from the water before bringing it up to the deck of the exploration vessel. After venting the firing chamber 52 the operating chamber 45 may be vented by actuating the solenoid valve 78 and holding it open for about 10 to 30 seconds for example to allow the compressed air within the operating chamber 45 to flow into the bore 41 within the backbone 43 through the air trigger passage 103 and back into the operating chamber 45. As the air flows out of the air trigger passage 103, the air is directed around the annular groove 105 that surrounds the face near the outside diameter of the operating flange 59 and down to the air vent passage 37 and into the air cushion chamber 47. The outward direction flow check valve 39 will then vent the air from the operating chamber to outside of the tuned pulse source 60.

As an additional safety measure a manual firing chamber air vent valve 125 may be mounted on the front of the firing chamber 52 at a point as far from the outlet ports 66 as practical which will be kept open when the tuned pulse source 60 is not intended to contain compressed air. Depending upon the length L of the firing chamber 52, the air vent vale 125 may be positioned near the end cap 127 of the firing chamber 52 remote from the outlet ports 66. As an additional safety feature, the flush mounted manual air release valve 70 positioned on the end cap 72 of the main housing 64 may also be kept open to vent the operating chamber 45 and prevent the operating flange 59 of the shuttle assembly 49 from sealing to the operating seal 107. If it is desired to launch the tuned pulse source 60 into the water prior to loading the firing chamber 52 the flush mounted manual valve 70 may be opened and a shot of low pressure air about 100 psi for example may be injected into the operating chamber 45 which will move the shuttle assembly 49 to the sealed position and load the operating chamber 45 to that pressure, thus keeping the shuttle assembly 49 closed and sealed preventing water from flowing in through the outlet ports 66 and flooding the firing chamber 52 before the air supply from the exploration vessel is opened to supply high pressure air to the tuned pulse source 60. The additional safety features of the tuned pulse source 60 are unique over air guns of the prior art and are critically important for safe operation and implementation of the tuned pulse sources 60 within the ULF cluster 90 of the present invention.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the tuned pulse sources to particular applications, without departing from the scope of the following claims and equivalents of the claimed elements.

What is claimed is:

1. A tuned pulse source for seismic exploration comprising:
   a housing having a wall that defines a firing chamber and an operating chamber;
   an air distribution valve assembly attached to the wall, outside the firing chamber and the operating chamber, the air distribution valve assembly having (1) an air inlet configured to receive compressed air from a towing vessel, (2) a first air outlet, (3) a second air outlet, and (4) a one-way valve; and
   wherein the firing chamber is filled with the compressed air through a first air input passage separate from a second air input passage that fills the operating chamber,
   wherein the first air input passage is fluidly connected to the first air outlet,
   wherein the second air input passage is fluidly connected to the second air outlet, and
   wherein the one-way valve is fluidly connected between the second air input passage and the second air outlet and allows the compressed air only to enter the operating chamber.

2. The tuned pulse source for seismic exploration of claim 1, wherein the air distribution valve assembly further comprising a solenoid valve configured to release the compressed air from the second air input passage through an air trigger passage, between the wall and an operating flange located in the operation chamber.

3. The tuned pulse source for seismic exploration of claim 2, wherein the one-way valve of the air distribution valve assembly is a check valve.

4. The tuned pulse source for seismic exploration of claim 1, further comprising an air release valve located in a cushion chamber, between the firing chamber and the operating chamber, and configured to vent the operating chamber outside the housing.

5. The tuned pulse source for seismic exploration of claim 1, further comprising an air release valve located in the firing chamber and configured to vent the firing chamber.

6. The tuned pulse source for seismic exploration of claim 1, further comprising an air release valve located in the firing chamber and configured to vent the firing chamber outside the housing.

7. A tuned pulse source for seismic exploration comprising:
   a housing having a wall that defines a firing chamber, a cushion chamber, and an operating chamber, wherein the cushion chambers is sandwiched between the firing chamber and the operating chamber;
   a shuttle assembly having a first end that separates the firing chamber from the cushion chamber and a second end that separates the cushion chamber from the operating chamber; and
   an air distribution valve assembly attached to the wall, outside the firing chamber, the cushion chamber, and the operating chamber, the air distribution valve assembly having (1) an air inlet configured to receive compressed air from a towing vessel, (2) a first air outlet, (3) a second air outlet, and (4) a one-way valve,
   wherein the firing chamber is filled with the compressed air through a first air input passage, which is separate from a second air input passage that fills the operating chamber,
   wherein the first air input passage is fluidly connected to the first air outlet,
   wherein the second air input passage is fluidly connected to the second air outlet, and
   wherein the one-way valve is fluidly connected between the second air input passage and the second air outlet and allows the compressed air to enter the operating chamber.

8. The tuned pulse source for seismic exploration of claim 7, wherein the air distribution valve assembly further comprising a solenoid valve configured to release the compressed air from the second air input passage through an air trigger passage, between the wall and the second end of the shuttle assembly.

9. The tuned pulse source for seismic exploration of claim 8, wherein the one-way valve of the air distribution valve assembly is a check valve.

10. The tuned pulse source for seismic exploration of claim 7, further comprising an air release valve located in the cushion chamber, and configured to vent the operating chamber outside the housing.

* * * * *